United States Patent
Tang et al.

(10) Patent No.: US 9,430,264 B2
(45) Date of Patent: Aug. 30, 2016

(54) SYSTEM AND METHOD FOR MANAGING RESOURCES IN VIRTUALIZED ENVIRONMENT BASED ON RESOURCE STATE INFORMATION AND POLICY INFORMATION

(75) Inventors: Chuanbin Tang, Shanghai (CN); Li Xiong, Shanghai (CN); Yanxin Wang, Shanghai (CN)

(73) Assignee: Transoft (Shanghai), Inc., Shanghai (CN)

( * ) Notice: Subject to any disclaimer, the term of this patent is extended or adjusted under 35 U.S.C. 154(b) by 239 days.

(21) Appl. No.: 14/001,031

(22) PCT Filed: Feb. 23, 2012

(86) PCT No.: PCT/CN2012/071497
§ 371 (c)(1),
(2), (4) Date: Aug. 22, 2013

(87) PCT Pub. No.: WO2012/113336
PCT Pub. Date: Aug. 30, 2012

(65) Prior Publication Data
US 2013/0332927 A1 Dec. 12, 2013

(30) Foreign Application Priority Data
Feb. 23, 2011 (CN) .......................... 2011 1 0043959

(51) Int. Cl.
*G06F 9/455* (2006.01)
*G06F 9/50* (2006.01)

(52) U.S. Cl.
CPC ....... *G06F 9/45545* (2013.01); *G06F 9/45558* (2013.01); *G06F 9/5005* (2013.01); *G06F 9/5027* (2013.01); *G06F 2009/45579* (2013.01)

(58) Field of Classification Search
CPC ................ G06F 2009/45579; G06F 9/45545; G06F 9/45558; G06F 9/5005; G06F 9/5027
See application file for complete search history.

(56) References Cited

U.S. PATENT DOCUMENTS 8,776,050 B2 * 7/2014 Plouffe et al. ..................... 718/1
2005/0060702 A1 * 3/2005 Bennett ............... G06F 9/45558
718/1

(Continued)

FOREIGN PATENT DOCUMENTS

CN 1906580 1/2007
CN 101207623 6/2008

(Continued)

OTHER PUBLICATIONS

Ali et al, Job Submission Description Language (JSDL) Specification, 2008, Version 1.0, pp. 1-81.*

*Primary Examiner* — Abu Ghaffari
(74) *Attorney, Agent, or Firm* — Hamre, Schumann, Mueller & Larson, P.C.

(57) ABSTRACT

The present invention discloses a system of managing resources in virtualized environment, including OSS and its associated NMS and EMS, service delivery platform, master, slave, network switches and shared storage devices. Virtual machines run on the slave. Service delivery platform is connected to the OSS, and sends a request to master for resources. Master is connected to network switch and slaves, and controls slaves and virtual machines running on slave. Slave is connected to network switch, shared storage device and TMN. Shared storage device is connected to network switch, slave and master. The disclosed invention can efficiently and reliably manage physical device resources (including servers, storage, network equipment, etc.) and virtual device resources (including virtual machines, virtual storage, virtual switches, etc.) centrally, and implements transaction-level management of all kinds of resources in virtualized environment through a distributed transaction processing method.

29 Claims, 14 Drawing Sheets

(56) References Cited

U.S. PATENT DOCUMENTS

| | | | |
|---|---|---|---|
| 2007/0294697 A1* | 12/2007 | Theimer et al. | 718/102 |
| 2008/0052719 A1* | 2/2008 | Briscoe et al. | 718/104 |
| 2010/0162259 A1* | 6/2010 | Koh | G06F 9/45558 718/104 |
| 2010/0198972 A1* | 8/2010 | Umbehocker | 709/226 |
| 2010/0318652 A1* | 12/2010 | Samba | 709/224 |
| 2011/0231696 A1* | 9/2011 | Ji | G06F 11/1438 714/3 |

FOREIGN PATENT DOCUMENTS

| | | |
|---|---|---|
| CN | 101493781 | 7/2009 |
| CN | 101957780 | 1/2011 |
| CN | 102103518 | 6/2011 |

* cited by examiner

SYSTEM AND METHOD FOR MANAGING RESOURCES IN VIRTUALIZED ENVIRONMENT BASED ON RESOURCE STATE INFORMATION AND POLICY INFORMATION

FIELD OF THE INVENTION

The present invention relates to computer virtualization technology and applications, and in particular, to a system and method for managing resources centrally in virtualized environment.

BACKGROUND

At present, the popular virtualization technology VMM (Virtual machine monitor) provides a virtual abstraction layer between hardware and operating system. VMM is also known as the host operating system. A virtual machine (VM), running on VMM, is also called a guest operating system. These VMs can be regarded as isolated guest operating system, which can share hardware resources. VMM allows multiple isolated virtual machines running on a single host, thus improves server utilization, reduces the cost of buying a server, and improves the availability of hardware and applications. Therefore it becomes pretty hot recently in the IT industry. With the VMM technologies matured and widely used, how to manage a large number of virtual machines in a pool centrally to deliver virtual resource service on-demand for users is increasingly becoming the focus of attention.

Enterprises or organizations use a variety of methods to manage different types of resources in distributed computing environment, including software resource, hardware resource, or a combination of both. Generally, companies employ many administrators who are responsible for managing different types of resources. For example, some administrators are responsible for the server (host) installation and management, as well as a variety of software installation on the server resources, such as operating systems, applications, and further update and maintenance the software. Thus for a large company, they need to hire a large number of different system administrators to manage hundreds of computing systems in the organization. Enterprises enable administrators to efficiently fulfill their duties through allocating keys and access policies to individual administrator. In addition to the System Administrator role above, the organization may arrange a group of system administrators only to manage a particular storage device. Among these administrators, companies may further assign some administrators to manage storage servers geographically distributed in different network, and so on. Similarly, company may arrange some administrators to manage network access only. The group may still assign administrators' duties in certain geographic location by specific user name and password.

Thus, in a traditional network environment, users getting access to specific resources in a system not only need to obtain a variety of permissions potentially from different levels of multiple administrators, but also need to interact with higher-level managers. In each instance (request), each system administrator may audit whether a user's request can be authorized. If not, the request is passed to a higher-level system administrator. This increases the burden of administrator. Although the burden can be solved by increasing the administrator levels, the solution brings more administrative overhead.

This is especially true with the rapid increase in hardware performance: The VMM can now make good use of these hardware capabilities to host a large number of virtual machines on a server. Each virtual machine is logically independent. It can be assigned a certain portion of the host memory and processing capabilities, and can be easily separated from other virtual machines. It can even be isolated from host server on which the virtual machine run. For users on the network, the virtual machine itself is a separate addressable computer system. Virtual machine can have a variety of functions, as another server on the network for software or hardware testing, and as a major computer system for thin client, and so on. There are other advantages for the virtual machine, such as easily hand-created and hand-deleted by administrators. Due to such flexible and powerful capabilities, virtual machines are widely installed on a server, numbered from ten to even hundreds, thus expanding the computer systems in an organization tenfold or even a hundredfold. Hence, the traditional layered management of administrators no longer afford to manage so many virtual machines. Further, traditional management methods can not adequately manage the additional requests for virtual machine, the licensing controls within each virtual machine, and the operation of each virtual machine. This requires a centralized automated method for managing virtual machine.

Aiming at virtual machine management issues, many large foreign companies and research institutions have launched their own solutions. VMWare's Virtual Center is virtual management software built on top of virtual platform, which enables centralized management and resource coordination for distributed servers and virtual machines. It also includes dynamic resource allocation, disaster recovery, and so on. Oracle has also developed its own VM Manager (virtual machine manager), which can manage many virtual desktop pools and virtual machines in the pool. VM Manager provides web-based access interface, also uses a Master-Slave system. For Xen virtual machine, some management software is also developed, e.g. virtual machine migration mechanism based on Xen is implemented by University of Cambridge of England. Denali project presided by University of Washington focused on providing virtual machine required for network services, capable of running a large number of lightweight virtual machines in a separate physical server. Global PlanetLab (an internet project) platform, used the Linux VServer (Linux Virtual Server) technology to provide global service nodes for users, with each user owning a globally distributed node to run their own applications.

Many organizations research on applications of virtual machines used in a distributed environment. A large number of virtual machines can be managed in Xen-based Parallax Project presided by Cambridge University, including eliminating write share, increasing the client's cache, using the template images to build the entire system. Ventana system uses centralized storage to ensure multiple versions isolation and mobility of virtual services; Researchers in American University of Florida firstly proposed virtual machine to be used in the traditional grid and other distributed environments, and proposed grid service architecture based on virtual machines. Currently, distributed computing based on virtual machine has become a hot research topic.

On the other hand, the purpose of centralized management of virtual resources is to respond to user application requests quickly and efficiently, especially for large number of concurrent requests. A transaction is a basic element used to build a reliable application, and to ensure that all involved parties have been able to reach an agreement with output result. Traditionally, a transaction has four fundamental properties, known as ACID properties. Atomicity: All changes to data are performed as if they are a single operation. That is, all the changes are performed, or none are done; Consistency: Data is in a consistent state when a transaction starts and when it ends; Isolation: results of all operations can't be shared outside until the transaction is committed; Durability: After a transaction successfully completes, changes to data persist and are not undone, even in the event of a system failure. When the application covers a plurality of distributed subsystems, or the application is composed of a plurality of separate components, the transactions can help the application handle failures in each separate blocks clearly.

The traditional transaction processing technology is mainly used for database system. However, with the development of computer science and technology, transaction processing concept has been introduced more widely into distributed network computing environment. Thus the field of distributed transaction processing emerges. The distributed Transaction means a transaction may involve multiple data storages, each data storage is based on the blocks (a lun (logical unit number) or a group of luns), files (local or remote file system) or relational (database) operations. It is a distributed sequence of operations, the data operated being distributed on different websites in the network, in order to access data storage of the respective website. When an application has a unique function to access or update data in multiple transactional resources, it should take advantage of distributed transaction, where the application moves data from one database to another, requiring a distributed transaction. The X/Open organization defines the reference model of Distributed Transaction Processing (DTP), including Application Program (AP), Resource Manager (RM), Transaction Manager (TM), Communications Resource Manager (CRM) and communication protocols.

Virtual machine is a special resource, unlike the general data resources. Each virtual machine has its own life cycle: when the virtual machine powers off (off), it is stored on disk as a file; when the virtual machine is in running state, it is a computer system running separately-assigned memory and processor power. A VM (virtual machine) instance may also require VM (Virtual Machine), LUN (logical unit number), Raid (Redundant Array of Independent Disks), vswitch (virtual switch), Nic (NIC) and other resources, which in turn involves a variety of resource management. In order to ensure access to a variety of bottom-layer resources, especially the block-level storage resources, it is necessary to provide transaction-level guarantees. Therefore, distributed transaction management are introduced here.

SUMMARY

The purpose of the disclosed invention is to overcome the deficiencies in the prior art to provide a system and method for managing resources in virtualized environment. The system can efficiently and reliably manage physical device resources (including servers, storage, network equipment, etc.) and virtual device resources (including virtual machines, virtual storage, virtual switches, etc.) centrally, which provide infrastructure-level services for external environments. The present invention implements transaction-level management of all kinds of resources in virtualized environment through a distributed transaction processing method, to ensure performance and security of resource access.

Technical solutions to achieve the above objectives are:

A system for managing resources in virtualized environment, comprising OSS and its associated NMS and EMS, service delivery platform, master, slave, network switch and shared storage devices. At least one virtual machine runs on said slave, wherein:

The said service delivery platform is connected with said OSS, and makes a resource request to the master;

Said master is connected with said slave and network switch, receives the service delivery platform requests, which controls the slave and virtual machine running on a slave;

There is at least one said slave, which is connected to network switch, shared storage device and TMN, and interacts with said master;

Said shared storage device is connected to network switch, slave and master.

Said system for managing resources in virtualized environment, wherein the said TMN includes EMS and NMS, said NMS is connected with OSS, said EMS is connected with said slave, and the devices managed by said EMS include physical devices and virtual devices.

Said system for managing resources in virtualized environment above, wherein each said slave comprises several virtual machines, a VMM connected to the virtual machines, and hardware devices connected to VMM. The VMM is connected to virtual machines in said slave, and also connected to virtual machines in other slaves.

Said system for managing resources in virtualized environment, wherein said VMM contains a vSwitch, said hardware includes nic, and said Nic is connected to vSwitch and network switches respectively. VM image and user file information are stored in said shared storage device.

Said system for managing resources in virtualized environment, wherein master includes JSDL agent module, Application Program, resource manager and the transaction manager, further comprising:

Said JSDL agent module 041 parses user-defined request in JSDL file and policy information, decomposes application request into transactions, and solves the resources required for each transaction execution, and sends transaction requests to said application Program. JSDL file is transmitted to JSDL agent module from the service delivery platform using JSDL;

Said Application Program receives request from JSDL agent module, defines transactions within transaction boundaries and access resources, and specifies a series of resource operations;

Said Application Program receives request from JSDL agent module, defines transactions within transaction boundaries and access resources, and specifies a series of resource operations;

Said transaction manager controls the life cycle of transaction, including transaction begin and transaction end, and determines transaction scheduling and transaction routing based on transaction scheduling and information in resource manager.

Said system for managing resources in virtualized environment, wherein said transaction manager includes a transaction monitor, transaction monitor monitors the transaction, unifies the transaction time through virtual time mechanism, and puts transaction into the waiting queue.

Said system for managing resources in virtualized environment, wherein said transaction manager further comprises a transaction scheduler, determines the priority level of transaction and marks the transaction that has higher priority level;

determining transactions that may operate concurrently and mark them;

planning the sequence of operations;

determining whether the transaction can be performed and which slave the transaction can be performed on.

Said system for managing resources in virtualized environment, wherein said transaction manager further comprises a transaction router, which determines the transaction route;

When a slave is not available, the transaction is routed to another available slave.

Said system for managing resources in virtualized environment, wherein said resource manager comprises a resource state machine, which stores resource state information required by transaction performing.

Said system for managing resources in virtualized environment, wherein the resource state information stored in said state machine includes virtual machine state, the host state, the memory state, and network state.

Said system for managing resources in virtualized environment, wherein said resource state machine comprises a state machine controller, detector controller, comparators, clock, registrar, and virtual machines state machine table, said detector controller and comparators check and compare states and its transition, said state machine controller obtain required functions by configuring registrar.

Said system for managing resources in virtualized environment, wherein the lifecycle of a virtual machine includes four main states: Running, Off, Paused and Sleeping, which are stored in said virtual machine state machine table, wherein running state further includes user-defined programmable states.

Said system for managing resources in virtualized environment, wherein said resource manager comprises a resource reference model, which represents mapping relationship between resource unified identifier and real resource address using a metadata of tree structure, and creates resource reference relationship.

Said system for managing resources in virtualized environment, wherein said resource reference model comprises resource reference table and resource information table, wherein:

said resource reference table includes the resource identity, resource description and resource metadata. Each resource is assigned a unique identifier so that it can be located by resource name, and global resources can be integrated into a logical entity. Said metadata information includes logical address information of resource, where the resource is referred layer-by-layer through a distributed hash table, until the real location of the resource is found;

said resource information table stores various resources description information, including network resources, storage resources, server resources, and so on.

Said system for managing resources in virtualized environment, wherein said resource manager further comprises a resource management module, which is used to manage resource access and configuration.

Said system for managing resources in virtualized environment, wherein said resource management module includes resource access authentication, access control and resource configuration information.

Said system for managing resources in virtualized environment, wherein said slave further comprises:

A resource manager agent module connected with said resource manager, reports resource state information to master using TCP protocol;

A transaction implementation module connected with said transaction manager, is responsible for transaction commit;

A Libvirt module connected with said transaction implementation module, provides a common API for common functions implemented by VMM.

Said system for managing resources in virtualized environment, further comprises host agent, DFS API and network API connected to master, wherein:

Host agent, reports virtual state information in slave to master, and updates master as resource state changes;

DFS API, provides storage resource interface to master;

Network API, provides network resource interface to master.

Said system for managing resources in virtualized environment, wherein said master and several slaves are in a group, several groups are in a data center, and the order of resource reference is: from the data center to a group, from a group to the slave, and then to the virtual machine, and finally to the virtual machine hardware; or from the data center to a group, from a group to a slave, and finally to the physical hardware on slave;

each resource has a unique identifier;

Resource is referred by means of pseudo-random number.

A method for implementing system for managing resources in virtualized environment, uses distributed transaction process to manage resource in a virtualized environment, comprising:

Running transaction in a virtual machine. The execution of the transaction needs supportive virtual machine resources, server resources, network resources and storage resources;

Transaction execution changes the state of said various resources.

Said method for implementing system for managing resources, further comprises:

Transaction Monitors Monitor transaction request, then starts transaction scheduler to look up resource state information in resource state machine of resource manager;

The system determines whether the transaction can be implemented, according to the state of resources and strategy.

Said method for implementing system for managing resources, said determining transaction can be executed by resource state and strategy, further comprises:

If resources are unavailable, the transaction is rejected;

If resources are available, the transaction proceeds to execute;

If it is a write transaction, lock related resource.

Said method for implementing system for managing resources, further comprising:

After determining resources are available, transaction scheduler determines which slave a transaction should be executed on based on policy;

find the location of resources through resource reference model;

route the transaction to running slave using routing protocol.

Said method for implementing system for managing resources, further comprising:

if the transaction is rejected, put the transaction to the wait queue, waiting for the next execution;

Query resource state machine again to see if there are available resources.

Said method for implementing system for managing resources, further comprising:

Back up files to ensure atomicity of transaction, lock files to support transaction isolation, thus ensuring two-phase commit in file environments.

Said method for implementing system for managing resources, further comprising: After a transaction is committed, the resource state information, resource routing information and resource allocation information are changed. Resource manager agent module updates the master.

Said method for implementing system for managing resources, further comprising:

Set timing mechanism so that when the transaction runs beyond the set time, execution of the transaction will be completely terminated.

Said method for implementing system for managing resources, further comprising:

User defines policies, comprising: multiple users multiplex the same app (The word "multiplex" means "share an expensive resource" in software industry. This word originates from telegraphy and telephony industry.); an app corresponds to a domain; several components are under one domain; multiple components multiplex a virtual machine; a virtual machine uses multiple physical resources through the external Monitor to monitor the physical state of the resource;

A component is a virtual machine instance.

The benefits of the invention: The disclosed invention uses master-slave architecture to manage virtual machines; there are a master and several slaves in a group; master runs on a host separating from slave; and virtual machine don't run on this host. When the slave has adequate performance, master can also run on the slave. There are a number of virtual machines running on a slave, master can manage slave and virtual machines CENTRALLY in a group. User sends requests for the virtual machine, and the system can complete a variety of user requests for the virtual machine.

Distributed Transaction Processing (DTP) architecture is introduced to the management core module master to handle large-scale and parallel transaction requests. The transaction manager is responsible for transaction monitoring, scheduling, routing, communicating and submitting. Resource Management module is responsible for resource authentication, access control, and security. Virtual machine state machine can guarantee concurrent operations implementation, and compromise resource conflicts effectively. Resource reference model stores the resource state information, resource usage information, and resource location information. Resource managers provide API for the transaction monitor. Agent in slave reports a variety of resource information to master, and information on the master is updated in real time. The system can efficiently and reliably manage virtual machine resources, virtual storage resource, and virtual network resources centrally, thus provide infrastructure-level services to external environments.

BRIEF DESCRIPTION OF THE DRAWINGS

Slave

DETAILED DESCRIPTION

The following detailed description makes reference to the accompanying drawings.

Figure 1A:
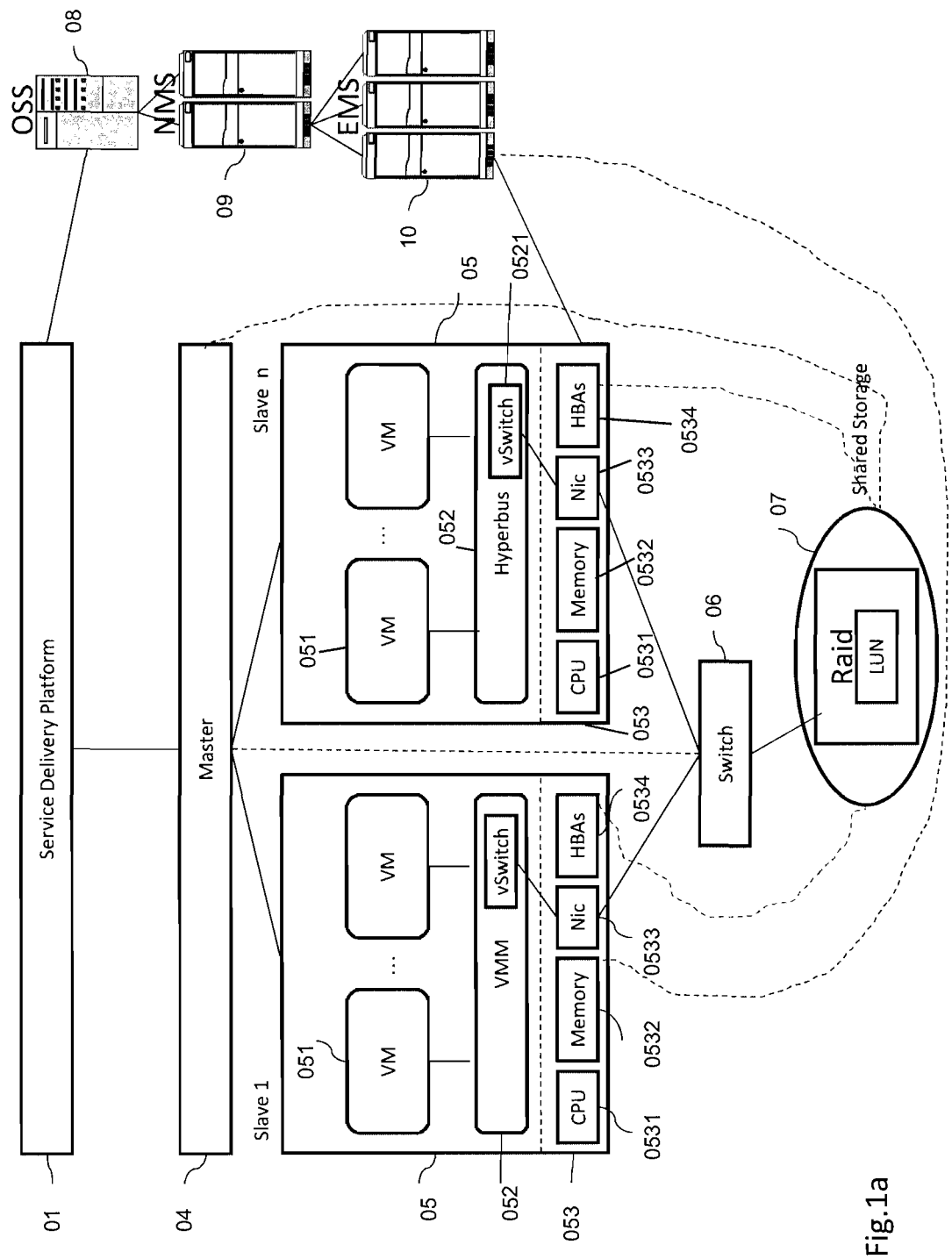
FIG. 1a is a structured diagram of a system for managing resources in virtualized environment.

Refer to FIG. 1a, a general view of the disclosed invention, reflecting the relationship between management module and resources.

Resources here refer to the physical device resources and corresponding virtual device resources which can be built through virtualization technology.

Physical device resources include computing resources (such as servers), storage resources (such as memory) and network resources (such as switches, I/O, etc.). One or more particular preferred embodiments of the invention will be described in detail.

A system of managing resources in virtualized environment, includes OSS 08 and its associated NMS, service delivery platform 01, master 04, slave 05, network switches 06 and shared storage devices 07. There is at least one virtual machine 051 running on slave 05, service delivery platform is connected to the OSS, and sends a request to master for resources; Master 04 is connected to network switch 06 and slave 05, and controls slave 05 and virtual machines 051 running on slave; There is at least one slave 05. Slave 05 is connected to network switch 06, shared storage device 07 and TMN, and interacts with master 04. Each slave 05 includes several virtual machines 051, VMM (Virtual Machine Monitor program) 052 connected to a number of virtual machines 051, and hardware devices connected to VMM 052. VMM 052 is connected to virtual machines 051 in slave 05, and also connected to virtual machines in other slaves. Shared storage device 07 is connected to network switch 06, slave 05 and master 04; TMN comprises NMS (Network Management System) 09 and EMS (Element Management System) 10; NMS 09 is connected with OSS 08; EMS 10 is connected with slave 05, wherein: NMS 09 controls the relationship among network elements for the entire network, and is responsible for interoperability among network elements; EMS 10 manages a group of network element, including physical and virtual devices. There is a vSwitch (virtual switch) 0521 in VMM 052; hardware 053 includes CPU 0531, Memory (RAM) 0532, Nic (NIC) 0533 and HBAs (host bus adapter) 0534; Nic 0533 is connected to vSwitch 0521 and network switches 06 respectively; HBAs 0534 is connected to the shared storage device 07; VM image (virtual machine images) and user file information are stored in shared storage device 07, wherein virtual machine 051 is controlled by the VMM 053, and share hardware resources through the VMM 052. vSwitch 0521 is a software implementing logic switch with multiple ports. Multiple virtual machines 051 on different slaves can be connected with vSwitch 0521, and the vSwitch is also connected with Nic.

In the disclosed invention, OSS 08 can be combined to manage resources, which is widely used in telecommunications. OSS 08 is a computer system used by telecommunications service provider, and it refers to network system operating telecommunications network. OSS 08 can support some processes such as: network inventory maintenance, service provision, network element configuration, and error management. Operations can be managed by OSS 08, to smooth the operational privileging. Telecommunications Management Network TMN, as a reference model of operating support systems (OSS) used by telecommunications service provider, is proposed by M.3000 under the recommendation of ITU-T. The bottom layer of TMN is EMS 10, and NMS 09 is the upper layer of EMS 10. NMS 09 controls the relationship among network elements in entire network level, and is responsible for connection, interaction and interoperability among network elements. EMS 10 is responsible for the management of individual network elements, such as setting/getting NE attributes, and sending commands to the network element. EMS 10 is a equipment management subsystem that manages a group of devices from the hardware viewpoint, wherein the devices include not only physical devices, but also virtual devices, such as VM (Virtual Machine). However, EMS 10 does not care about service-related VM operations, such as cloning. It only concerns several aspects: fault, configuration, performance, and security. The hardware is programmable, which makes the partitioning of hardware resources changeable, and can be partitioned by NMS 09, EMS 10, etc. OSS 08 manages multiple NMS 09, while NMS 09 manages multiple EMS 10. In an embodiment of the disclosed invention, OSS08, NMS09, EMS10, as additional external components, provide resource management support for the main body of the disclosed invention. OSS 08 is connected with the service delivery platform 01. Service delivery platform 01 is used to integrate the capabilities of communication technology and information technology, as well as the creation of services far beyond the boundaries of technology and network. Service Delivery Platform 01 generally refers to service delivery in a particular technology or network domain, such as web, IMS (IP Multimedia Subsystem), IPTV (IP TV), mobile TV, and so on. Service delivery platform 01 may typically provide service control environment, service creation environment, service orchestration and execution environment, as well as media control, addressing, and even other low-level communications capabilities abstraction. In the disclosed embodiment of the invention, the service delivery platform 01 is an additional external component, while the main body of disclosed invention can accept all requests from service delivery platform 01. A small amount of interaction requests from Service Delivery Platform 01 is sent to EMS 10, including the following queries: which server master 04 is, and who the backup server for master 04 is. Master 04 is a program that runs on a separate server, or shares a server with virtual machines 051, as long as the server's performance is adequate. Virtual machines can not run in master 04. In a group, there is only one master 04. Master 04 can manage multiple slaves 05 in a group, and multiple virtual machines 051 on each slave, and all the virtual machines 051. Transactions, either a read or write transaction, go through master 04. The various operational functions to virtual machine 051 are accomplished through master 04, such as starting the virtual machine 051, shutting down the virtual machine 051, increasing the virtual machine 051, deleting the virtual machine 051, displaying the information of virtual machine 051, and so on. Master 04 is also responsible for managing the various image information of virtual machines 051, configuration information, identity information of VM, etc. Master 04 works in the scope of VM instance. Because running VM instance requires server, storage or virtual storage, network or virtual network resources, VM image also requires storage device. Master 04 manages these network and storage resources, including resources reference, as well as error messages reporting to master. Master 04 is connected with slave 05, and the request passes through master 04 to the slave 05 next. Slave 05 is also called "server", "host", or "node". Application and operating system in virtual machine 051 are running on vCPU (virtual CPU), vStorage (virtual memory) and virtual I/O (virtual input/output devices) facilities, and are assigned with a certain percentage of CPU processing power, storage capacity, I/O traffic of the low-level hardware through VMM 052. vSwitch 0521 is software implementing logic switch with multiple ports, equivalent to a physical network switch. vSwitch 0521 is connected with multiple virtual machines 051 in different slaves 05, and connected with real Nic 0533. Nic 0533 is connected to the real network switch 06, and network switch 06 is connected to multiple hosts. In one or more embodiments of the disclosed invention, in general, a back-up network switch 06 is set up for failover of single network switch 06. Virtual Disk (VD) is used as the standard file system in the virtual machine, which provides block-level interface, as well as physical disks. The advantages of VD are compatibility, versioning, isolation, encapsulation, etc. These can also be achieved through the network file system. Disk storage in the virtual machine 051 may be mapped to certain files in the shared storage device 07 via HBAS 0534, and can also be mapped to files in storage devices in accessible hardware or storage devices in accessible hardware directly. LUN is scsi command execution unit in shared storage. For example, network storage devices may include NAS (Network Attached Storage) and SAN (Storage Area Network) devices, or Raid (Redundant Array of Independent Disks).

Figure 1B:
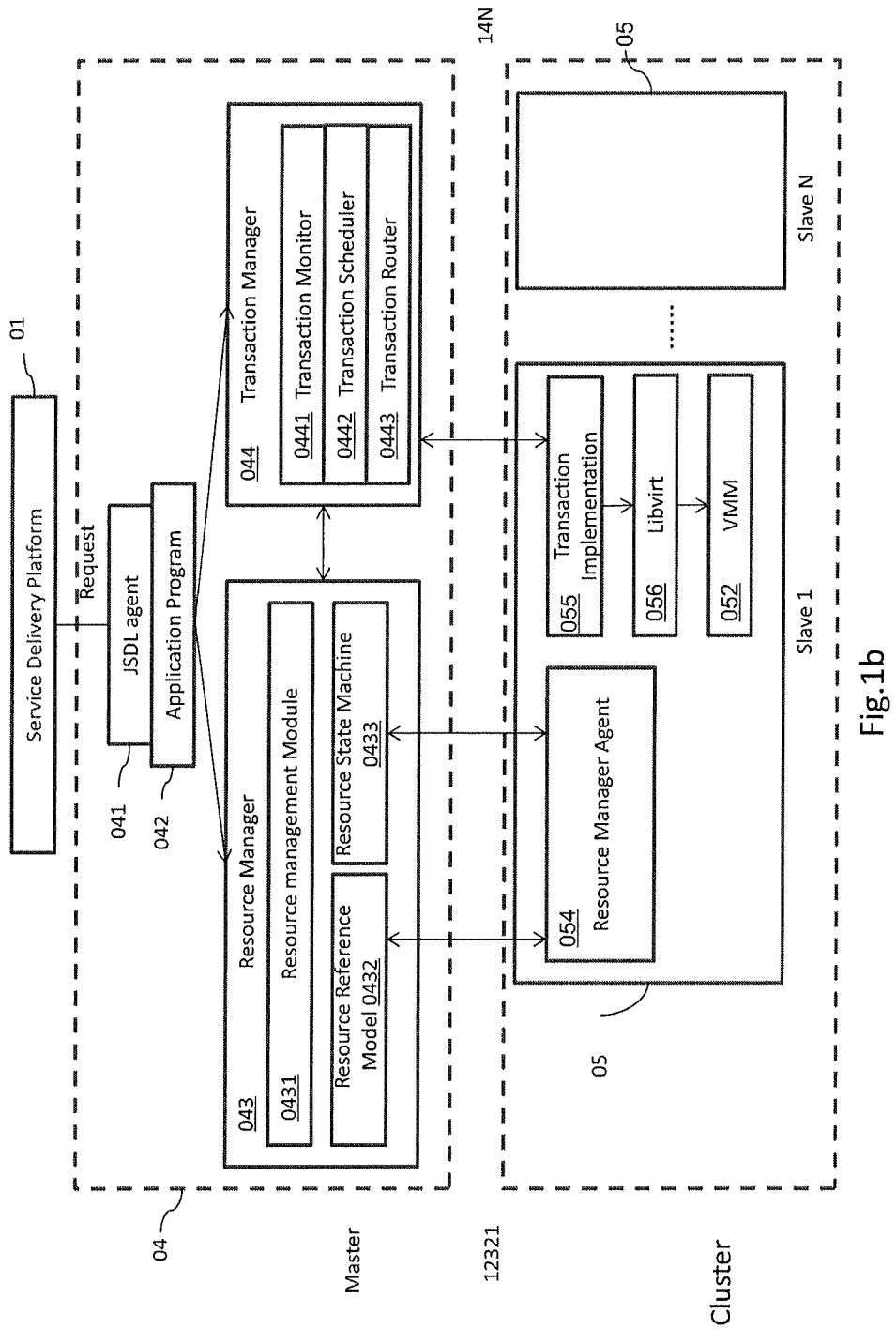
FIG. 1b is logic system block diagram of a system for managing resources in virtualized environment.

Refer to FIG. 1b, which shows a schematic diagram of one of the disclosed invention, taking the master 04 and slave 05 as an example. Master 04 includes JSDL (Job Submission Description Language) agent module 041, Application Program 042, resource manager 043 and the transaction manager 044, wherein: JSDL agent module 041 parses user-defined request in JSDL file and policy information, decomposes application requests into transactions, and computes the resources needed for each transaction execution. JSDL agent module 041 sends transaction requests to said application Program 042. JSDL file is transmitted to JSDL agent module 041 from the service delivery platform 01 using JSDL. Application Program 042 receives request from JSDL agent module 041, defines transactions within transaction boundaries and accessible resources, and specifies a series of resource operations. Resource manager 043 manages computer resources centrally, including host resources, virtual machine resources, storage, and network resources, and is responsible for unified resource location and safety;

Transaction manager 044 controls the life cycle of transaction, including transaction begin and transaction end, and determines transaction scheduling and transaction routing based on transaction scheduling and information in resource manager, and eventually commit transaction. The transaction manager 044 includes transaction monitor 0441, the transaction scheduler 0442 and transaction routers 0443, wherein: transaction monitor 0441 monitors the transaction, unifies the transaction time through virtual time mechanism, and puts transaction into the waiting queue. Transaction scheduler 0442 calculates needed resources for the transaction, determines the priority level of transaction, and marks the transactions of higher priority. Transaction scheduler 0442 determines transactions that may operate concurrently, marks them, and plans the sequence of operations using algorithms and strategies. Algorithms and strategies are common for transaction scheduler 0422 in general. Some public algorithms are used in the disclosed invention, such as the fixed-priority-first (FPF) scheduling algorithm and the highest-priority-preemptive-scheduling algorithm, Transaction scheduler 0442 determines whether the transaction can be performed and which slave 05 the transaction can be performed on. Transaction Router 0443 determines the transaction routing: when a slave 05 is unavailable, the transaction will be routed to another available slave 05 by router 0443. Resource manager 043 includes a resource state machine 0433, the resource management module 0431, and the resource reference model 0432, wherein: Resource state machine 0433 stores resource state information required by transaction processing. The resource state information stored in state machine 0433 includes virtual machine state, the host state, the memory state, and network state;

Resource management module 0431 manages physical and virtual resources uniformly. Resources managed by resource management module 0431 include resource access authentication, access control and resource configuration information; Resource Reference Model 0432 uses metadata table with a tree structure to represent mapping relationship between resource unified identifier and real location, and creates a resource reference relationship. Resource manager proxy module 054, which is connected with Resource manager 043, reports resource state information to master 04 through TCP (Transport control protocol) protocol and resource location information to master 04 through CEPH-ext; Transaction implementation module 055, which is connected with the transaction manager 044, is responsible for the transaction commit; Libvirt modules 056, which are connected with the transaction implementation module 055, provide a common API for common functions implemented by VMM.

FIG. 1b is a logical system block diagram of the present invention. FIG. 1b describes a logic processing framework for the request from users. Service Delivery Platform 01 submits request from users to the main body of the disclosed invention. In the disclosed invention, all requested operations are on VM 051. Here object managed by Service Delivery Platform 01 is based on virtual machine 051. Service Delivery Platform 01 receives the request from users, schedules requests, and transmits requests to the master 04 next. The application requests can be lamp, sqid, apache, etc., Lamp is short for linux, apache, mysql, PHP. Master 04 in turn informs its capabilities to the upper service guy, delivery platform 01. JSDL is a language used to describe how many resources the computing tasks require, particularly used in a grid environment, but not limited to that environment. JSDL language includes phrases and standardized XML schemas, which can be used to optimize expression of a set of XML elements for resources. Here, JSDL agent module 041 parses user-defined request in JSDL file and policy information, decomposes application requests into transactions, and computes the resources required for each transaction execution. Transaction is a complete working unit, with its own ACID properties: a transaction may be formed by a plurality of calculation tasks; the tasks may include a user interface, data query, and communications; if a task fails, all task components of the transaction can not be completed, and the data will be rolled back to its previous state. Transaction Manager 043 provides tools to simplify and automate application programming, implementation, as well as complex, distributed application management. In order to standardize the distributed transaction processing, X/Open organization defines a Distributed Transaction Processing (DTP) model. DTP reference model is the recognized industry standard for distributed transaction processing, which provides a standard system framework for distributed transaction monitor 0441 of the disclosed invention. In such architecture framework, different applications can share resources provided by various resource managers, ensure a variety of resources operate regularly and effectively, and collaborate in global transaction processing. Application Program 042 belongs to application commercial layer. It defines transaction boundaries, and to formulate actions making up the transaction.

The layer concerns only commercial logic, and knows nothing about the specific resources beneath it in the diagram. Application Program 042 then transmits the global transaction to transaction manager 044, which comprises Distributed Transaction Monitor 0441, the transaction scheduler 0442, and the transaction router 0443. Application Program 042 communicates with transaction manager 044 via an API (application programming interface). Distributed transaction monitor 0441 in transaction manager 044 monitors the transaction request, puts the transaction into the waiting queue, and initiates transaction scheduler 0442 scheduling transaction. Transaction Monitor 0441 is responsible for assigning a unique tag to the transaction, and recording the lifecycle from transaction begin to transaction commit. When the transaction commits, the transaction monitor 0441 eliminates collection of read and write from the transaction record, defines blocked transaction needed to wake up, gathers collection of addresses, eliminates defined transaction from the transaction index and address index, and retries the transaction blocked. Transaction scheduler 0442 is responsible for transaction level scheduling. First, it determines the priority level of transaction according to a certain scheduling algorithm, and schedules transaction in the queue. Then, Transaction scheduler 0442 communicates with the resource manager 043, looks up resource state information in resource state machine 0433 through API provided by resource manager 043, including virtual machine state information, host state information, store state information, and network state information. These state machines are stored in memory, using a distributed hash table (DHT) format. Resource state machine 0433 is used to implement concurrency operation, and to transform the distributed management to centralized management. Resource reference model 0432 stores resources routing information, metadata information, and resource identity information. Resource management module 0431 stores a variety of resource management, including resource allocation information. Distributed transaction scheduler determines whether the transaction can be performed based on the resource state machine information and resources required for executing the transaction. If transaction can not be executed, the transaction is rejected. Otherwise, transaction execution is continued. Since running a VM instance requires virtual machine resources, host resources, storage resources, and network resources at the same time, the information of these resources determines the performance of the VM instance. Such information is stored in resource state machine 0433, described in detail below. After transaction is rejected, the rejection message is returned to the client, the transaction execution terminates (failed transaction). If transaction is able to continue, the distributed transaction scheduler 0442 determines which VM 051 in slave 05 the transaction is routed to in accordance with resource routing information in resource reference model 0432 and certain strategies. Transaction Router 0443 transmits transaction to the running slave 05 using routing protocol. Transaction is implemented in slave 05. Libvirt module 056 is called to operate virtual machine 051. Transaction is executed in a virtual machine 051 in slave 05, and execution of the transaction consumes server, storage and network resources. After transaction execution is completed, data stored in resource manager 043 is modified. Afterwards, transaction is submitted. In the first phase, the transaction manager 044 notifies all relevant data store agent in resource manager 043. The transaction manager then submits or pre-submits their transaction branch, and confirms whether all relevant data store can submit their transaction branch. When data storage receives pre-submit notice, if its own transaction branch can be submitted, the data storage records operation information of transaction branch, and responds to transaction manager 044 with an agree-to-submit message, during which time data storage can't do any more operation to the transaction branch. However, the transaction hasn't been submitted yet, and operation to release the shared resource has not yet been performed by the data storage: the shared resource is in a locked state. If data store can't submit their own transaction branch, it rolls back all operations, releases a lock on the shared resource, and returns a failure-reply to the resource manager 043. Here we need to write two-phase commit support function on the transactional store, namely to support the ACID. If it's a read transaction, there is only one-phase commit, because the read transaction does not change the state of data resources, and the resource need not be locked to wait for the second phase of commit. In the second phase, the transaction manager 044 reviews all pre-submission results returned by data storage. If all data storages are pre-submittable, transaction manager 044 demands all data storages to make a formal submit, so that the global transaction is committed. If any data storage fails to pre-submit transaction, transaction manager 044 demands all other data storages to roll back their operations, so that the global transaction is rolled back, releasing all resources with entries in virtual resource state table, resource management forms, and resource references form in resource manager 043.

Figure 2:
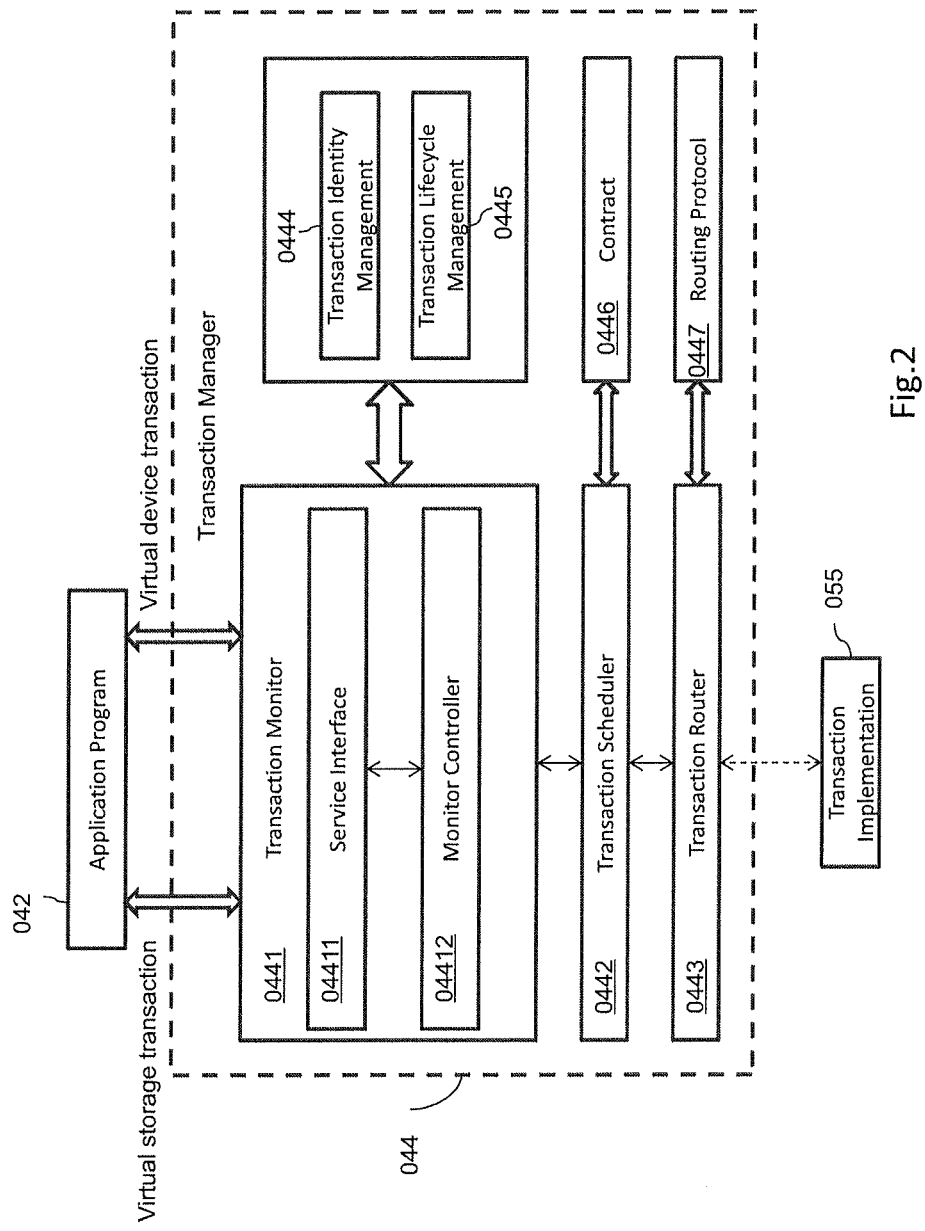
FIG. 2 is a detailed component diagram of transaction manager.

Refer to FIG. 2, which shows details of transaction manager 044 in the disclosed invention.

Transaction Manager (TM) 044 manages distributed transaction, is responsible for managing the lifecycle and operations of the distributed transaction object, spans multiple resource managers 043, manages the two-phase commit, and decides whether to commit or roll back distributed transaction through negotiation. Transaction Manager (TM) 044 comprises Distributed Transaction Monitor 0441, the transaction scheduler 0442 and transaction router 0443, wherein: Transaction Monitor 0441 is composed of service interface 04411, monitor controller 04412. Monitor Controller 04412 monitors the transaction request mainly, determines whether the request can be executed, and decides how to provide services in a distributed system. Service interface 04411 is an interface between Application Program 042 and transaction manager 044. When a transaction arrives, the service interface 04411 creates a connection to the transaction manager 044 for the transaction; when the transaction ends, the service interface 04411 closes the connection. In the disclosed invention, there are three results: the transaction is rejected, the transaction is committed, or the transaction is rolled back. In one or more embodiments of the disclosed invention, there are two categories of requested transactions, namely virtual devices transactions and virtual storage transactions. The virtual device transaction refers to operation to virtual devices, including virtual machine, virtual storage device, and virtual network device. Virtual storage transaction refers to operation to store files. Monitor Controller 04412 is responsible for measuring transaction performance, tallying the statistics of transaction arrivals, successes and failures, and putting transactions in the wait queue. Transaction Monitor 0441 is primarily responsible for managing transaction operations, transaction identity, transaction life cycle and two-phase commit. Transaction operations refer to the operations (actions) within a transaction, and the data sources these operations will act on. Transaction Identity Management is responsible for assigning a unique identifier to each transaction, which can be implemented by tables, in order to distinguish transactions, and to facilitate the transaction management. Transaction identity management module 0444 is responsible for transaction management in the disclosed invention. Transaction Lifecycle Management module 0445 is responsible for the whole lifecycle of transaction, from transaction arrival, transaction refuse, transaction execution, to transaction commit or transaction roll back. Transaction two-phase commit management is responsible for managing the two-phase commit of transaction. Since the disclosed invention uses a resource state machine 0433 to determine whether the transaction can be executed, the probability to roll back a transaction is very low. Since data sources in the disclosed invention are a data table or file system, both of which do not support two-phase commit, the disclosed invention uses a method of file lock and backup to ensure transaction atomicity and isolation, thus supports two-phase commit. Transaction scheduler 0442 schedules transaction. It first determines the priority level of transaction through contract algorithm. The resource consumption differs for different transactions. Transaction scheduler 0442 determines the priority level of transaction according to the resources a transaction may consume. This is implemented by contract algorithm in the disclosed invention. Transaction scheduler 0442 determines whether the transaction can be executed based on the resource state information in resource manager 043, as well as the location of VM (i.e. which VM 051 in which slave 05) the transaction can be performed. Transaction router 0443 transmits transaction to running slave 05 using routing protocol. If there are two virtual machines 051 running on the same host, shared memory can be used to upload information. Transaction Router 0443 is connected to the transaction implementation module 055 in slave 05.

Figure 3:
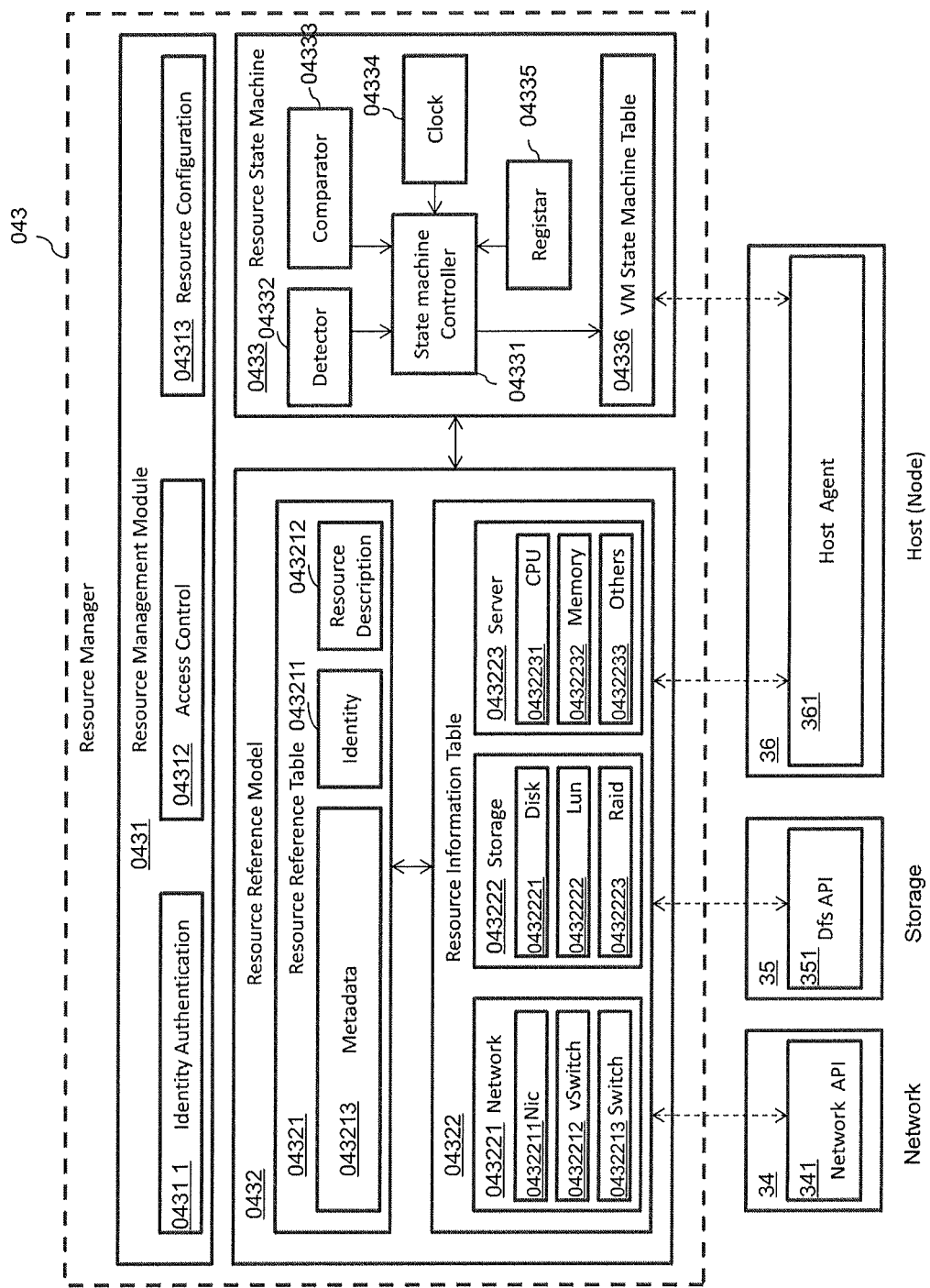
FIG. 3 is a detailed component diagram of resource manager.

Refer to FIG. 3, which shows the details of resource manager 043 of the disclosed invention. Resource manager 043 is responsible for managing resources required for running virtual machine instance, including virtual machine (VM), host, storage and network resources. Resource manager 043 provides data management service for running virtual machine instance, and to ensure data integrity and consistency. Resource manager 043 provides API (XA Resource) to transaction manager 044 (XA Resource), in order to control resource start and stop. Transaction manager 044 implements the two-phase commit protocol via the interface. In one or more embodiments of the disclosed invention, the data resources are stored in a table, the table is stored in memory. Wherein: State machine 0433 can go through all states by comparator 4333 or external events. Resource state machine 0433 includes virtual machine state machine (not shown in the figure), the master state machine (not shown in the figure), the storage state machine (not shown in the figure), and network state machine (not shown in the figure). Resource state machine 0433 acts as a resource controller to determine whether the transaction is performed. If not, the transaction is stopped in the first round; if executed, continues the following actions. Resource state machine 0433 can also transform distributed management to centralized management, and enable implementation of concurrent transactions to protect core resources. Resource state machine 0433 comprises a state machine controller 04331, and detector controller 04332, comparators 04333, clock 04334, registrar 04335, virtual machines state machine table 04336. Detector controller 04332 and comparators 04333 check and compare states and its transition. Resource state machine 0433 can change states based on the internal clock function or external asynchronous events. The state machine controller 04331 can obtain more functions by configure registrar 04335, which can configure the resource state machine 0433 better. The lifecycle of a virtual machine includes four main states: Running, Off, Paused and Sleeping, which are stored in virtual machine state machine table 4336, wherein running state further includes user-defined programmable states.

Resource reference Model 0432 includes resource reference table 04321 and resource information table 04322, wherein: Resource reference table 04321 includes the resource identity 043211, resource description 043212 and resource metadata 043213. These items provide an abstraction layer to time slice, memory, resources, directly find the resources below, and play a role of routing. Resource reference table 04321 assigns a unique identity to each resource, which can be implemented by global identity system. Wherever resources are moved to, they can be located by resource name. Thus global resources form a logical entity as a whole. Resource information can be stored by table, but not database, because database is a high-level and structured storage which is not suitable for distributed storage. Metadata information 043213 includes logical address information of resources, where resource is referred layer-by-layer through a distributed hash table, until the real location of the resource is found. Host Agent 361, Dfs API (Distributed File System API) 351 and network API (application programming interface) 341 are also included in the FIG. 3, wherein: Host Agent 361 reports state information of virtual machines 051 running on slave 05 to master 04, and also reports state transition information to master 04; Dfs API 351 is the interface between storage resource and master 04; Network API 341 is the interface between network resource and master 04. Resource Information table 04322 stores various resources description information. These resources are needed to run the virtual machine instances, including network resources 043221, storage resources 043222, server resources 043222, and so on. Server resources 043223 mainly include CPU resource 0432231, memory resource 0432232, and other device resources 0432233. The information of these resources is notified by host agent 361 to resource manager 043 in master 04. Host agent 361 will inform updated information to resource manager 043 as resource state changes. Storage resources 043222 include disk resource 0432221, Raid resources 0432222, Lun (logical unit number) resources 0432223, etc. The information of these resources is notified by Dfs API 351 to resource manager 043 in master 04. Storage resource information in resource manager 053 is updated when storage resource changes. Network resources 043221 include switch Resource 0432213, vSwitch resource 0432212 and Nic resource 0432211, which is provided by the following network API 341 in network 34. Updated information is reported to resource manager 043 as network resource state transmits, or an error occurs. Resource management module 0431 stores mainly a variety of resource management information, including access to the resource identity authentication 04311, resource access control 04312, configuration information 04313, and so on. Resource configuration 04313 is used to describe how many virtual machines run on a host, etc. Updated state information is reported to resource configuration 04313 as host state and virtual machine state change.

In the disclosed invention, master 04 and certain slave 05 are in one group; several groups are arranged in a data center (not shown in the figure); the resource references are ordered: from a group to slave 05, from slave 05 virtual machine 051, from virtual machine 051 to hardware 053; or from the data center to a group, from one group to a slave 05, from slave 05 to the physical hardware 053 finally, such as CPU, Memory, I/O and so on. Each resource is assigned an unique identifier; Resource can be referred by means of pseudo-random number.

A method for managing resources in virtualized environment in the disclosed invention, which uses distributed transaction processing to implement resource management in virtualized environment, includes:

Running transaction in a virtual machine 051, the execution of the transaction not only need virtual machine 051 resources, but also need server resources, network resources and storage resources to support transaction execution;

Transaction execution changes the state of various said resources, for example: by executing transactions, such as power off the virtual machine, the virtual machine state changes at that moment.

When the transaction monitor 0441 monitors transaction requests, transaction scheduler 0442 is started to look up resource state information in resource state machine 0433 in resource manager 043;

Determine whether the transaction can be executed, according to the state of resources and strategies, namely:

If there is no available resource, the transaction is refused to execute; if the transaction is rejected, the transaction is put to the wait queue for the next execution;

Query resource state machine again to see if there are available resources.

If resources are available, the transaction will proceed. After the transaction is committed, the resource state information, resource routing information and resource configuration information will change, resource manager agent module 054 reports updated information to the master 04.

If it is a write transaction, then lock the resource.

Determine what resources are available: the transaction scheduler 0442 determines on which slave 05 a transaction should be executed based on policy;

Find the location of resources through resource reference model 0432;

Route the transaction to the running slave 05 using routing protocol.

Backup files to ensure support atomicity of transactions. Lock files to ensure two-phase commit of transaction in file environment.

Also included is: Set the timing mechanism, when the transaction reaches beyond the set time, execution of the transaction will be completely terminated.

A user method comprising:

Client defines policies (strategies), multiple users use the same app (application), an app corresponds to a domain, there are several components are under one domain, multiple components multiplex a virtual machine, a virtual machine uses multiple physical resources through the external Monitor (not shown in the figure) to monitor the physical state of the resource;

A component is a virtual machine instance (virtual instance).

Figure 4:
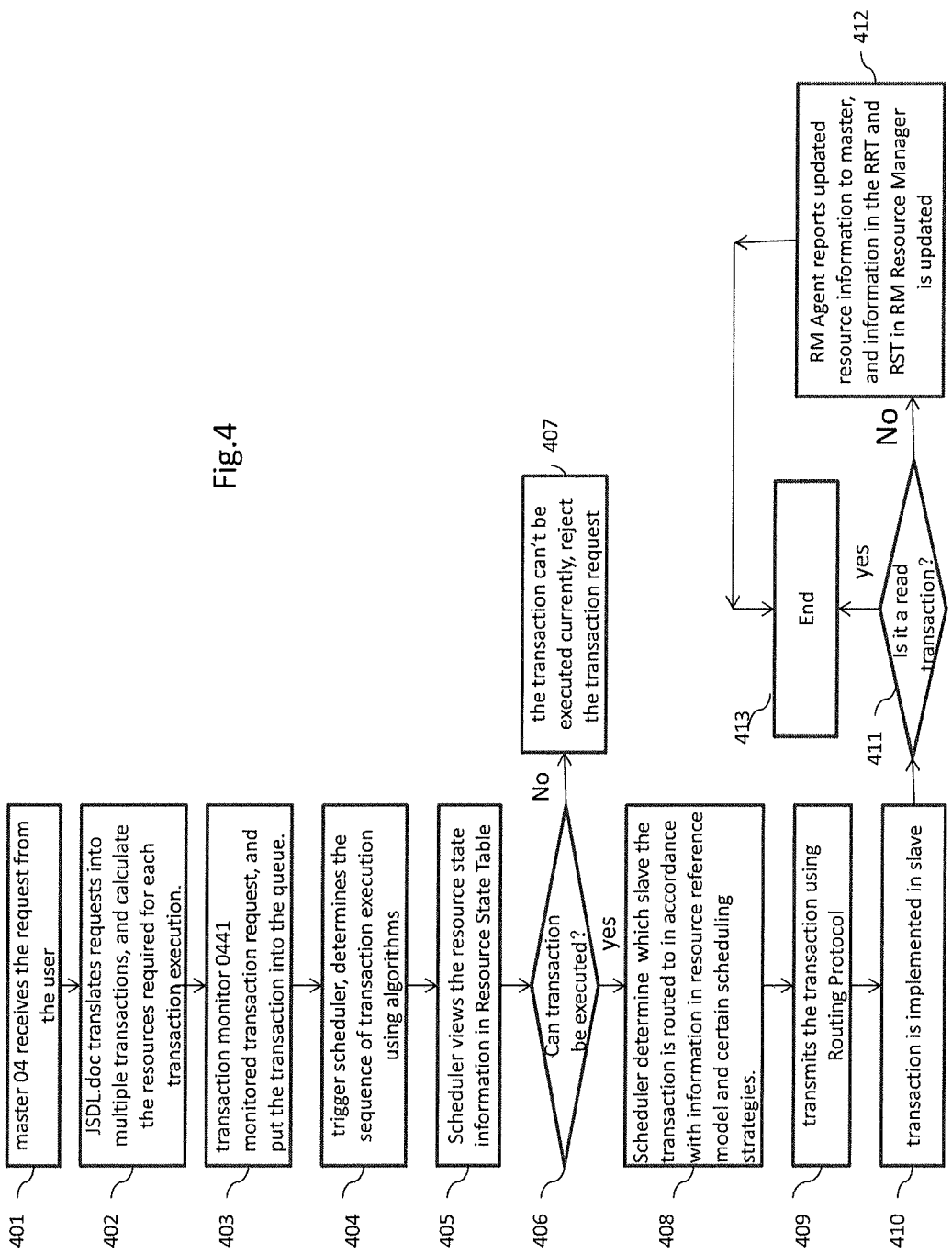
FIG. 4 is the entire flowchart from the user request to the execution results as a second part of the disclosed invention.

See FIG. 4, which is the entire flow from the user request to the execution results as a second part of the disclosed invention, and the whole process of transaction execution is illustrated. Service Delivery Platform (SDP) 01 submits the user's request, and the request is sent to JSDL agent module 041 in master 04 using JSDL protocol. Application Program 042 transmits the global transaction to transaction manager 044; transaction monitor 0441 in the transaction manager 044 monitors the transaction request, assigns a unique identifier to the transaction, records the life cycle of the transaction, and puts the transaction into the waiting queue. Meanwhile, transaction scheduler 0442 is initiated to schedule transaction. Transaction scheduler 0442 determines transaction priority: different transactions can have different priority levels. For example, some heavy-duty transactions may consume more resources, hence these transactions can be executed after other lightweight transactions are executed. After determining the priority level of transaction, the transaction scheduler 0442 views the state of the virtual machine 051 in resource state machine 0433, as well as host, storage, and network resource state information in the resource reference model 0432, to determine whether the transaction can be performed. If the transaction can be executed, transaction routing is determined in accordance with metadata information 043213 for routing. Then the transaction is submitted using routing protocols.

Specific steps are as follows:

Step 401, master 04 receives the request from the user.

Step 402, JSDL.doc translates requests into multiple transactions, and calculates the resources required for each transaction execution.

Step 403, transaction monitor 0441 monitors transaction request, and puts the transaction into the queue.

Step 404, trigger scheduler, determines the sequence of transaction execution using algorithms, wherein the algorithm refers to general algorithms mentioned above.

Step 405, Scheduler views the resource state information in Resource State Table.

Step 406, determines whether the transaction can be executed, if the transaction can be executed, then go to step 408, otherwise go to step 407.

Step 407, the transaction can't be executed currently, reject the transaction request.

Step 408, determine which slave 05 the transaction is routed to in accordance with resource routing information in resource reference model 0432 and certain scheduling strategies.

Step 409, router transmits the transaction using Routing Protocol.

Step 410, transaction is implemented in slave 05.

Step 411, determine whether the transaction is a read transaction, if it is, go to step 413, otherwise, go to step 412;

Step 412, RM Agent reports updated resource information to master 04, and information in the resource reference tables (RRT) and resource state table (RST) in RM (Resource Manager) is updated in real time;

Step 413, the process ends.

Figure 5:
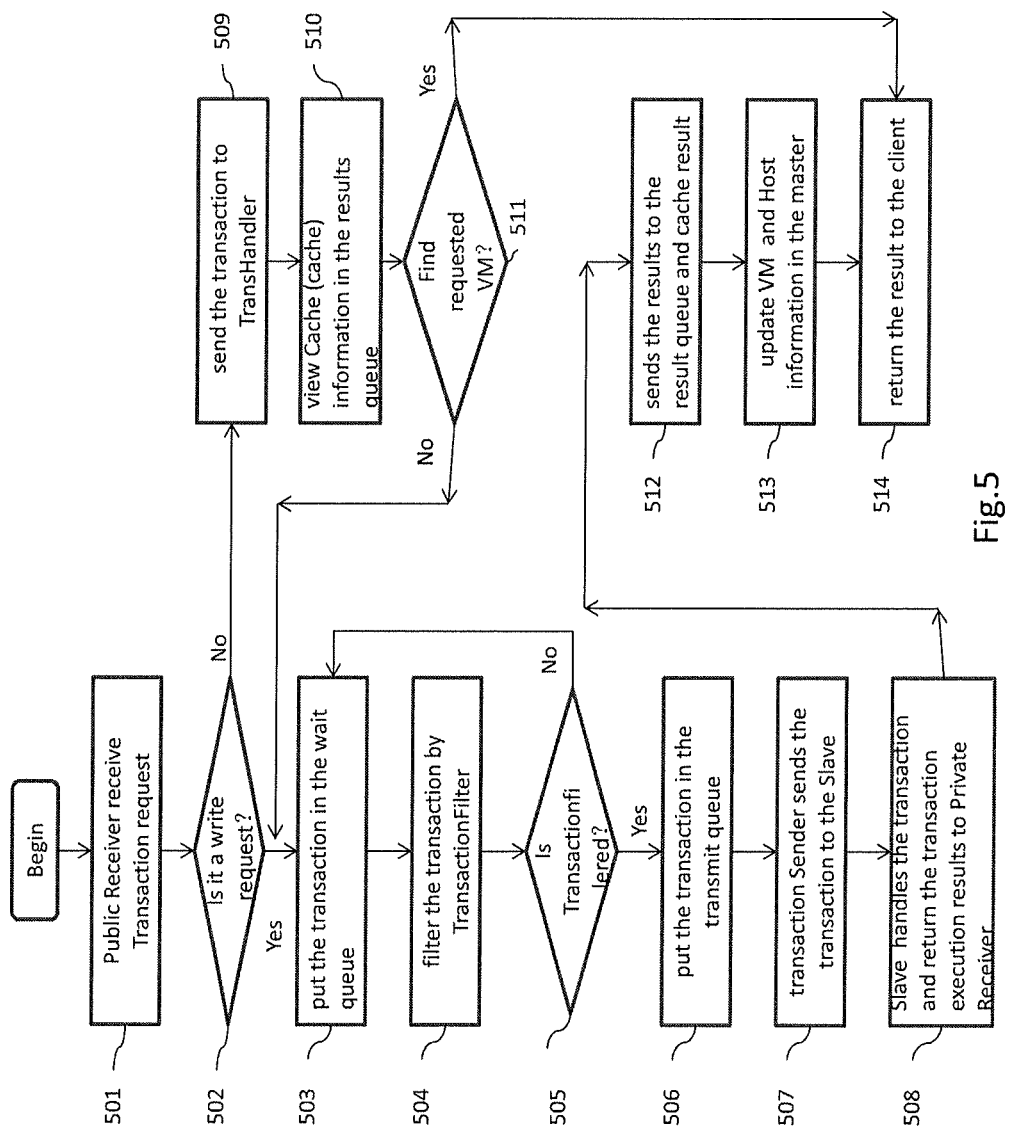
FIG. 5 shows the flowchart of the master 04.

See FIG. 5. FIG. 5 shows the flowchart of the master 04. PublicReceiver in master 04 receives a transaction request, then sends the transaction request to TransaHandler. It determines if there is read request information from the user in Result Queue, and if so, it views the results, and returns results to the client. If it is a write transaction, then PubliCReceiver puts transaction into the Waiting Queue, filters the transaction by TransFilter, and puts the transaction into transmit queue after filtering. Then the transaction is sent to the slave. There are categories of data in the system as follows: 1, Never-changing Data, such as Host uuid (Universally Unique Identifier), never change since it is generated. 2, Rarely-changing Data, such as cpu of VM, memory of VM (virtual machine), and other attributes, may change but do not regularly change. 3, Frequently-changing Data, such as the state of VM, change often. For different data, different strategies are adopted to deal with them. For the first and second category of data, they may be kept persistent in the system, and synchronized to local using a simple synchronization strategy. For the third category of data, don't keep them persistent locally, but adopt caching strategies to reduce the number of visits to the back system. An optimal solution is maintaining a number of socket objects, forming a socket pool, getting a socket object from the socket pool every time you need to send commands, and returning to the pool after use. Thus, by maintaining a small amount of sockets, the performance is improved. Detailed steps are as follows:

Step 501, Public Receiver receives transaction requests;

Step 502, determine whether it is a write request, if yes, go to step 503; otherwise, go to step 509;

Step 503, put the transaction in the wait queue;

Step 504, filter the transaction by TransactionFilter;

Step 505, determine whether the transaction is successfully filtered, if yes, go to step 506; otherwise the transaction back to 503;

Step 506, put the transaction in the transmit queue;

Step 507, transaction Sender sends the transaction to the Slave;

Step 508, Slave 05 handles the transaction and returns the transaction execution results to Private Receiver;

Step 509, send the transaction to TransHandler;

Step 510, view Cache (cache) information in the results queue;

Step 511, determines whether the virtual machine information required is found, and if so, go to step 514; otherwise the change to step 503;

Step 512, sends the results to the result queue and cache result information;

Step 513, update VM (Virtual Machine) and Host information in the master 04;

Steps 514, return the result to the client through the Result Sender. The client means that service delivery platform SDP 01 in the disclosed invention.

Master 04 transmits transaction to slave 05, slave 05 call libvirt to operate the virtual machine, and the implementation results is returned to the master04.

Figure 6A:
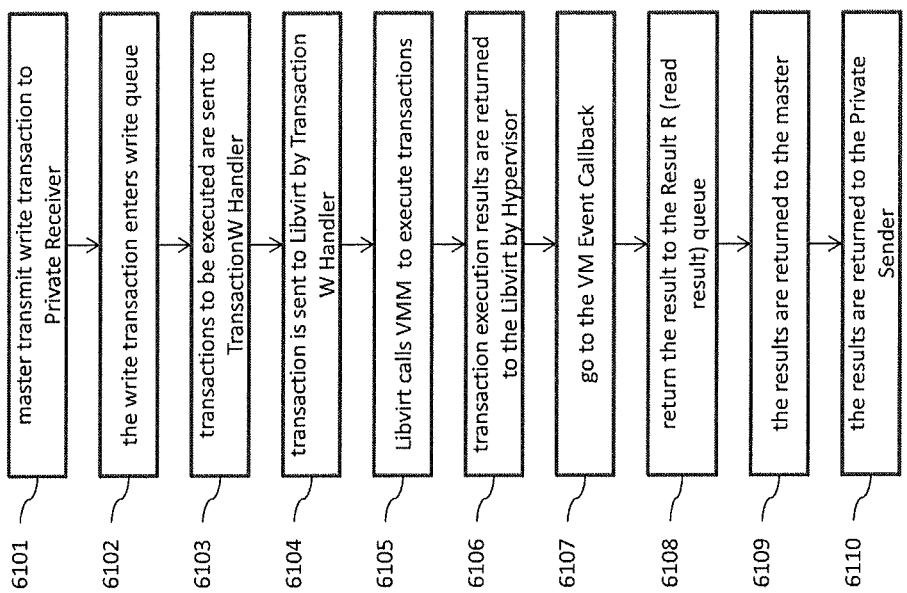
FIG. 6a gives the workflow diagram of write transaction executing in slave.

FIG. 6a gives the workflow diagram of write transaction executing in slave. Execution process of the read transaction is as follows:

Step 6101, master 04 transmits write transaction to Private Receiver;

Step 6102, the write transaction enters write queue;

Step 6103, transactions to be executed are sent to TransactionW Handler;

Step 6104, transaction is sent to Libvirt by Transaction W Handler;

Step 6105, Libvirt calls VMM to execute transactions;

Step 6106, transaction execution results are returned to the Libvirt by Hypervisor;

Step 6107, go to the VM Event Callback;

Step 6108, return the result to the Result R (read result) queue;

Step 6109, the results are returned to the master 04;

Step 6110, the results are returned to the Private Sender.

Figure 6B:
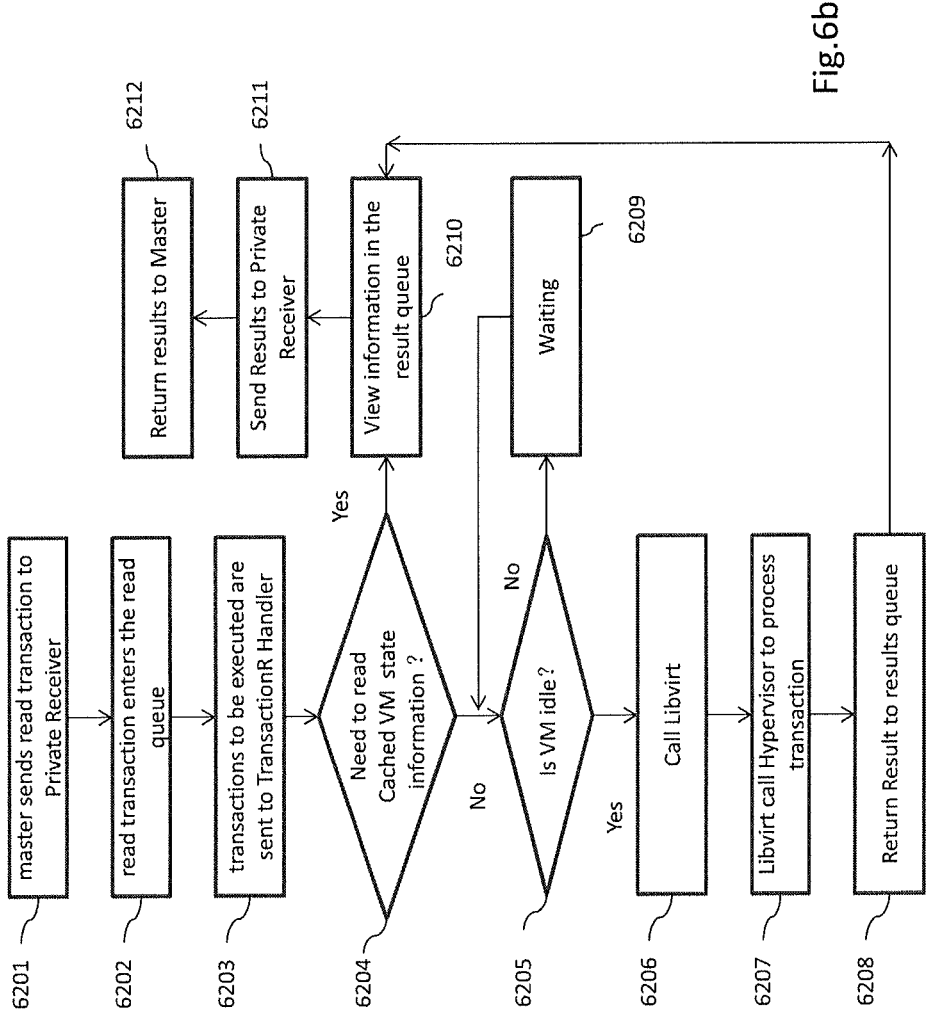
FIG. 6b shows the flowchart of the operation of the read transaction.
Figure 7:
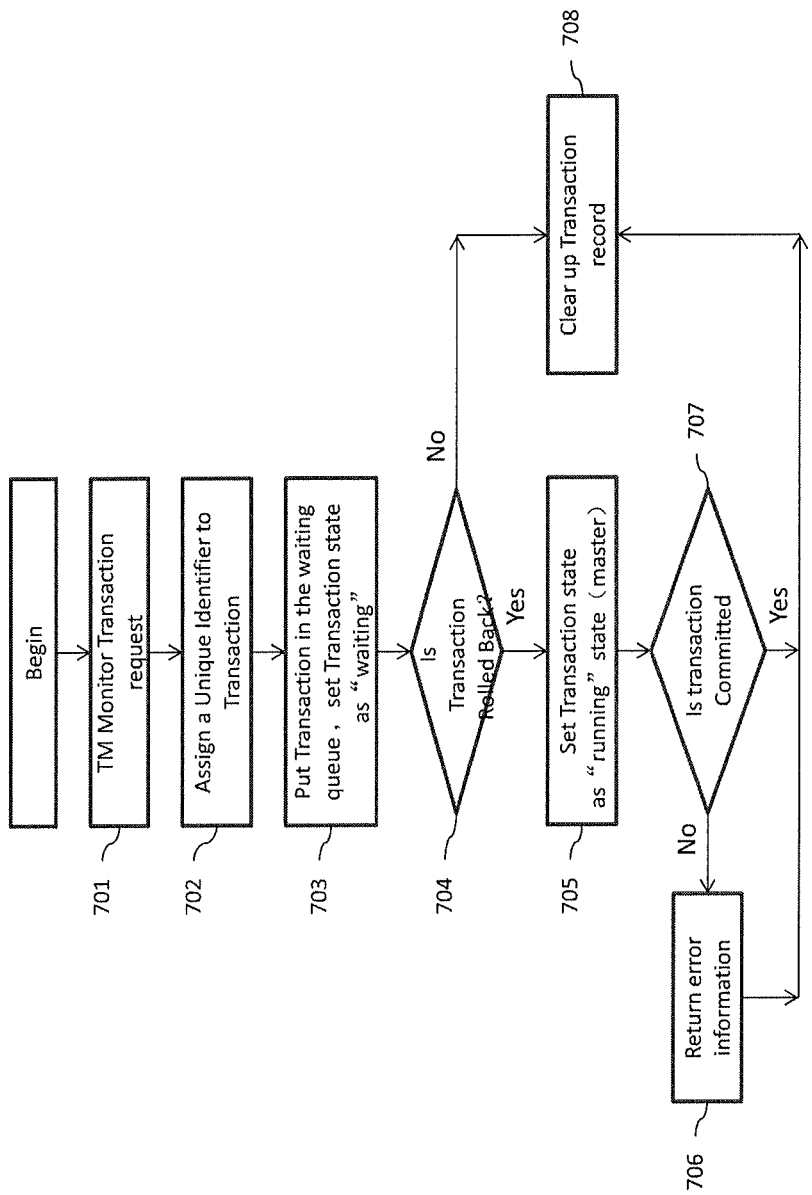
FIG. 7 is task flowchart of transaction monitor.

Slave FIG. 6b shows the flowchart of the operation of the read transaction. Execution process steps of write transaction are as follows:

Step 6201, master 04 sends read transaction to Private Receiver;

Step 6202, read transaction enters the read queue;

Step 6203, transactions to be executed are sent to TransactionR Handler;

Step 6204, determine whether what is needed to read is Cached VM (cached virtual machine) state information, if yes, turn to step 6210; otherwise, go to step 6205;

Step 6205, determine whether the virtual machine is idle. If so, turn to step 6206; otherwise, go to step 6209;

Step 6206, call Libvirt;

Step 6207, Libvirt calls VMM to process transaction;

Step 6208, return the results to the queue of results;

Step 6209, wait for the virtual machine to the idle state;

Step 6210, view information in the queue of the results;

Step 6211, send the results to Private Receiver;

Step 6212, the results are returned to the master 04.

Transaction Monitor 0441 is primarily responsible for controlling the life cycle of transaction, from transaction arrival to transaction commit or rollback. When the transaction arrives, record the transaction as arriving state; when the transaction is determined by the resource that it can not be submitted by the state machine, record the state of transaction as failure state, and clear up transaction records; When the transaction is executed, transaction state can be set to success or failure state, and clear the transaction log. Specific process is as follows:

Step 701, TM (Transaction Manager) monitor transaction request;

Step 702, assign a Unique Identifier to each transaction;

Step 703, put the transaction into the waiting queue and set transaction state as "Waiting";

Step 704, determine whether or not the transaction is rollbacked, and if so, turn to step 705; otherwise, go to step 708;

Step 705, set transaction state as "running" state (master in);

Step 706, return an error message;

Step 707, determine whether the transaction was Commitment, and if so, turn to step 708; otherwise, go to step 706;

Step 708, clear up transaction records.

Figure 8:
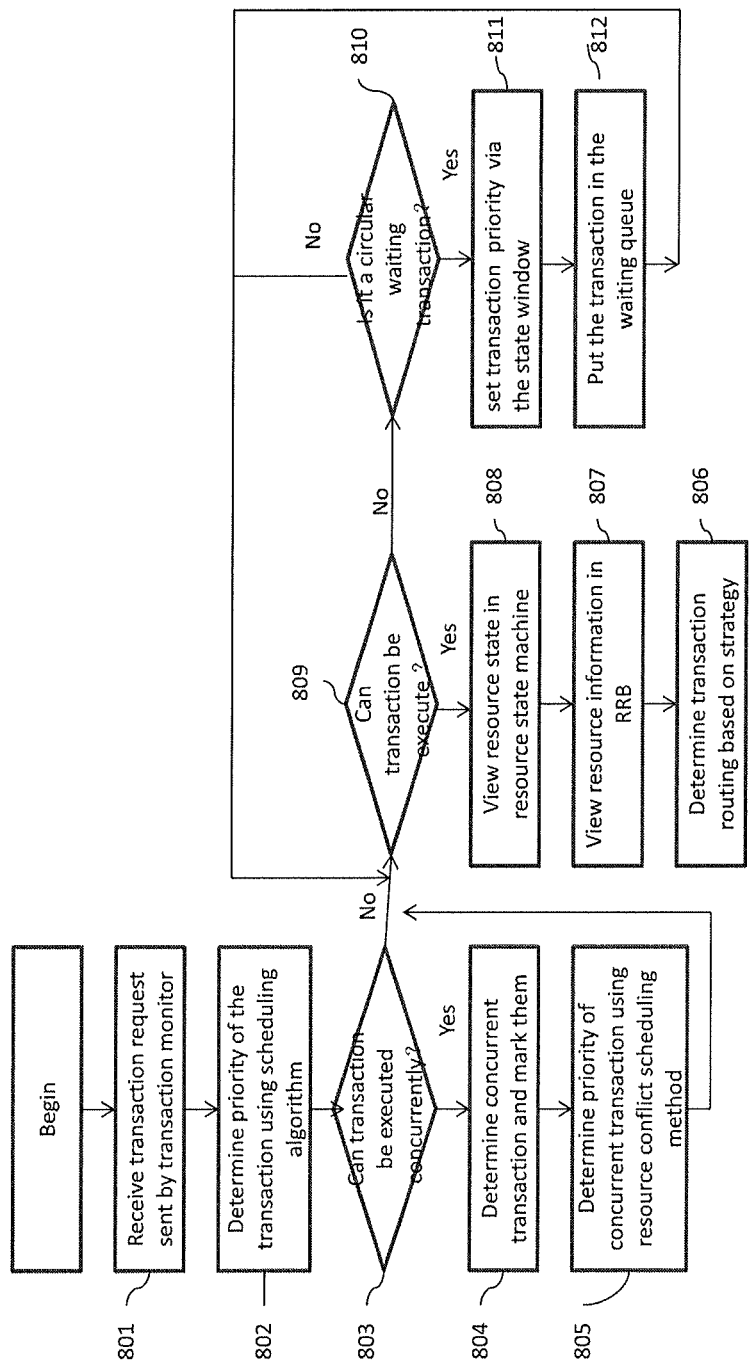
FIG. 8 shows the execution process of transaction scheduler.

FIG. 8 shows the execution process of transaction scheduler 0442. Transaction scheduler 0442 is responsible for transaction-level scheduling. The specific process is as follows: a scheduler needs to consider the entire lifecycle of a workload.

It is helpful to divide multiple requests into several categories, each category with a different priority, e.g. some lightweight requests take up little resources and time, hence can be set to execute first. If a different priority is assigned to each request, then since the algorithm itself is consuming CPU cycle time, this is not an optimal compromise. Following metrics are considered: the process/thread level, the consumption of CPU, Memory, and hard disk resources.

Transaction scheduler 0442 is executed as follows:

Step 801, receive transaction requests sent by transaction monitor 0441;

Step 802, determine the priority of the transaction using the scheduling algorithm;

Step 803, determine whether the transaction can potentially be executed concurrently. If so, turn to step 804; otherwise, go to step 809;

Step 804, determine transaction that can be executed concurrently, and mark with the same color-code;

Step 805, determine the priority of concurrent transactions using resource conflict scheduling method;

Step 806, determine transaction routing;

Step 807, view resource information in the RRB (resource reference table);

Step 808, view the state of resources in the State machine;

Step 809, determine whether the transaction can execute now, and if so, turn to step 808; otherwise, go to step 810;

Step 810, determine whether the transaction is a circular wait transaction, and if so, turn to step 811; otherwise, go to step 809;

Step 811, set certain priorities for the transaction via the state window;

Step 812, put the transaction in the waiting queue.

Figure 9:
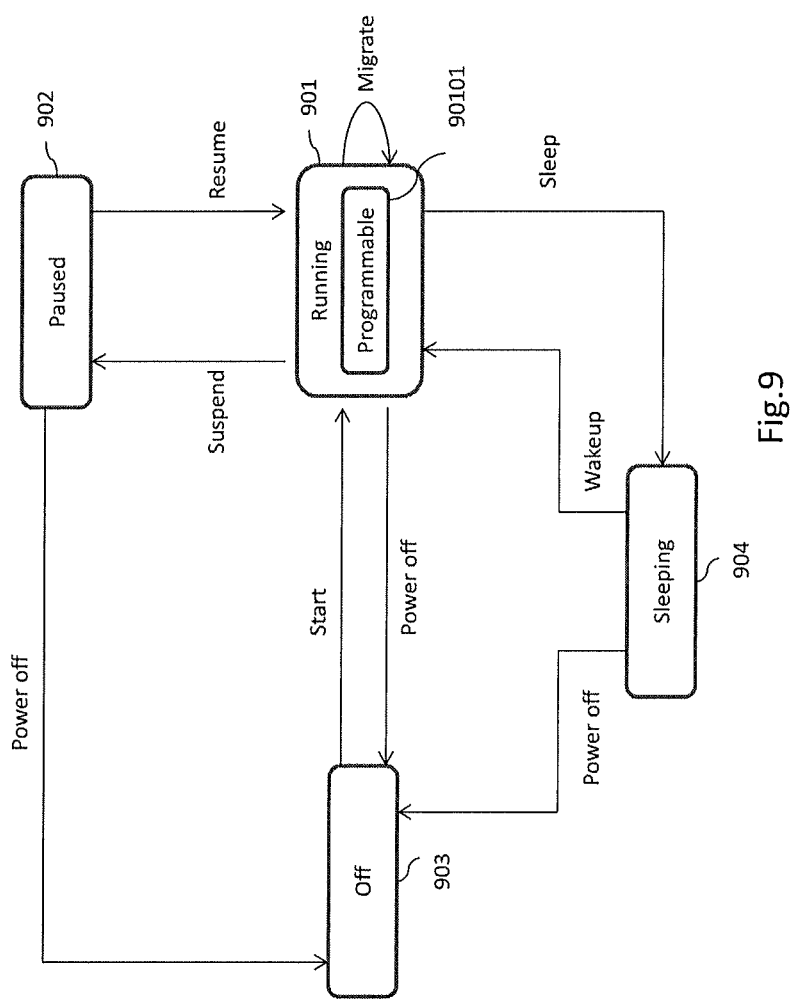
FIG. 9 shows the state transition of virtual machine in resource state machine.

FIG. 9 shows the state transition of virtual machine in resource state machine 0433.

A state transition diagram of the virtual machine is implemented in a form of network logic. Finite state machine is a very abstract software design patterns, and an modeling tool for object and behavior. Its main function is to describe the state sequence of objects in its life cycle, and how to respond to messages and events from outside world. Different from common design model, if a programmer wants to add a finite state machine in software, they need to write extra code as a logic control portion. There are two kinds of finite state machines: deterministic finite state machines and non-deterministic finite state machine. FSM (finite state machine) are often used to model reactive systems. Reactive systems respond to external messages and internal events, as driver systems. In the deterministic reactive systems, the sequence and value of input messages and events determines the response order of the system. Analyze each state to see if it should be decomposed. Through a state hierarchy structure, a large state is decomposed into a large number of sub-states, with the layers of decomposition based on complexity of the system; then gradually refine until all the states are inseparable, and state transition relationships are solid. Here the state machine is used to add a layer of resource controller in the architecture, which can handle concurrent transactions, and transform distributed processing to centralized processing. In one or more embodiments of the disclosed invention, state machine includes the following states: Running 901, Off 903, Sleeping 904, Paused 902 state, and there are transition mechanisms and lifecycle among these states. Running 901 state means the virtual machine is running. Off 903 state means virtual machine is shut down. For Sleeping 904 state, image all machines stop and leds flash only occasionally, which does not need a shutdown state. For a real machine, Sleeping state is different from state Off 903, but for VM, since no resource is occupied, the virtual machine needs to be shutdown. Paused 902 state is a suspended state: it may still consume some resources, so virtual machine need to be shut down. A sub-state of running state 901 is a programmable state 9011, defined by user, such as an interrupt, etc, and related to specific needs. The reason that this programmable state 9011 is added in our invention, is when virtual machine is running, the user can define a variety of strategies, each of these strategies, such as interrupts, etc, is programmable.

State machine transition route algorithm, decides which state the virtual machine transits to. When the action occurs, some actions causes the virtual machine 051 transits to another state, while other actions does not make the virtual machine state transit. State transition table shows the state transition relationship through the table. When the virtual machine is at state running 901, the state can be transited to state Paused 902 by Suspend operation, and virtual machine state can be transited to state Off 903 by power off operation. This also means state Running 901 can be transited to other three states by different operation. When Virtual machine is at state Running 901, it can also be migrated to other hosts, and keep the same state still. (When a virtual machine is at state Paused 902, it can be transited to state Running 901 by Resume operation, and be transited to state Off 903 by power off operation. When a virtual machine is at state Sleeping 904, it can be transited to state Running 901 by wakeup operation, and be transited to state Off 903 by power off operation. When a virtual machine is at state Off 903, it can be transited to state Running 901 by start operation. In the disclosed invention, the transition between states can be completed by looking up the table. When new state and control logic need to be added to state machine, it only need to modify information in the state table, or the table can even be dynamically modified. For simple state machine, this is very desirable, but the modifying overhead may affect the speed. Migration table is a data table describing VM migration. Traversing such a table consumes time and requires a lot of code to support. A timing engine is able to explain created migration table. This timing engine is also responsible for finding and matching migration, calling the response to the action, and changing the state. The benefit of such implementation is the logic of state machine is controlled in one place centrally, and the action and usage are separated, allowing change to the state machine logic dynamically.)

Figure 10:
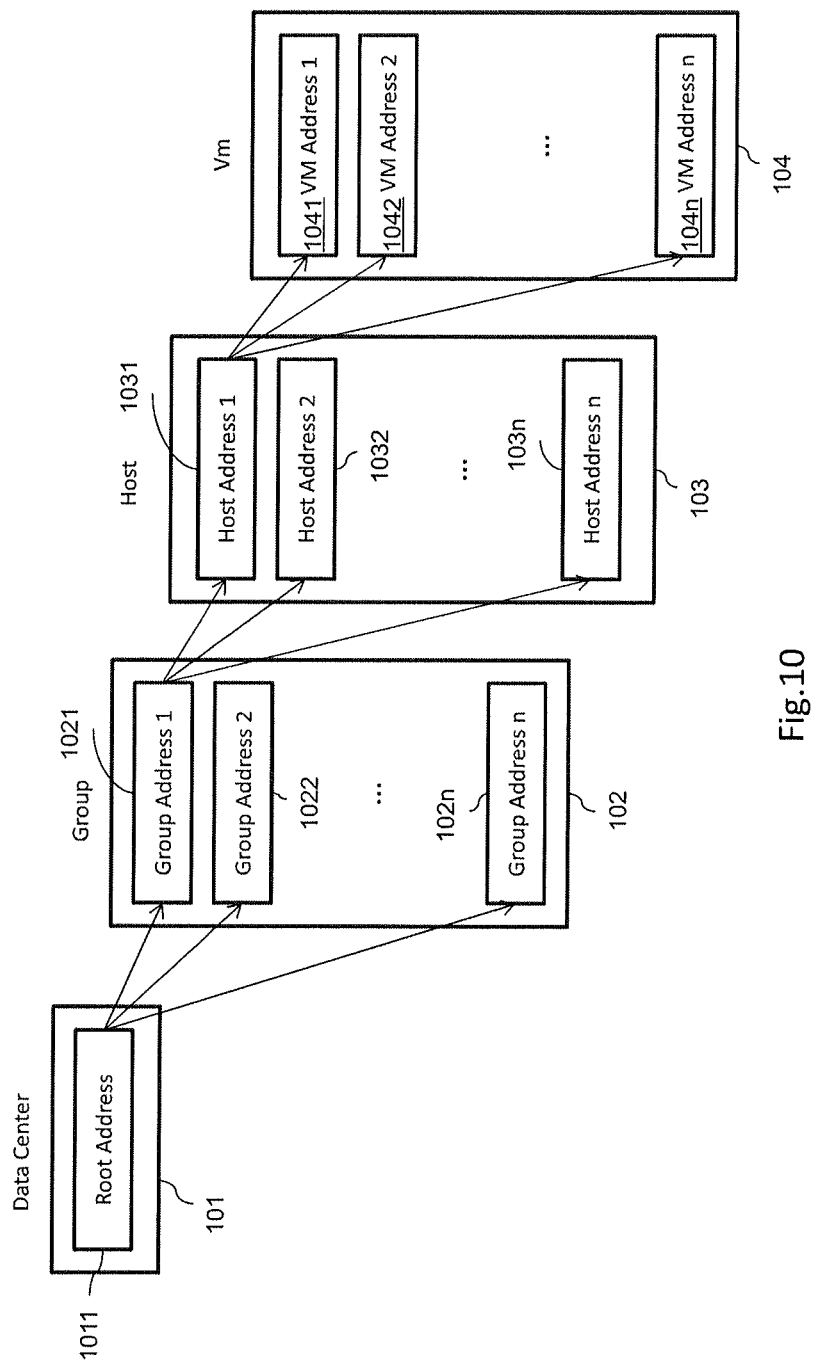
FIG. 10 shows a model diagram of the resource reference.

FIG. 10 shows a diagram of the resource reference model. Resource reference model is intended to refer to resources from top to bottom, including the VM resource, resources on host, storage resources, network resources, etc., which can be achieved by a distributed hash table. Resource Reference is from the data center to the group, to host, to the VM, and to virtual hardware; or from the data center to the group, to host, to the physical hardware resources. Each resource has a unique identifier computed by a pseudo-random numbers method to refer to resource. As shown in FIG. 10, for a data center, its roots address 1011 is the address of the data center 101; a data center includes more than one group 102, which can be referred to as group address 1 11021, group address 2 11022. There are multiple hosts 103 under a group 102, it can be referred to as host addresses 1 11031, host addresses 2 11032, . . . host addresses n 1103$n$, by a group address 1021. There are multiple virtual machines 104 under a host 103. It can be referred to as VM addresses 1 11041, VM addresses 2 11042, . . . VM addresses n 1104$n$ by a host address 1 1031. The same method can also be used in reference to a host of resources, storage resources, and network resources.

Reference can be implemented by a distributed hash table DHT. In a large-scale resource indexing and lookup, DHT is much faster than relational databases. In order to achieve the resource reference, the uniform resource identification system is used here, with each resource required for reference having a unique identifier. Identity system is used at all resource tables in the disclosed invention, and entire system is unified through the identity system together. Reference model and metadata are closely related, the two are directly connected. Reference model is achieved by dfs (distributed file system), in which management information for all nodes are stored.

The logical route is implemented by the ID system, in which the name and IP are separated, and network save can be achieved. Each component marks an IP address, equivalent to a layer of overlay in which logic diagram and logical approach are created by the ID system. In one embodiment of the disclosed invention, the two sets of lamp and two sets of instance are configured, where one set is for user, and another set is for developers to use.

Figure 11:
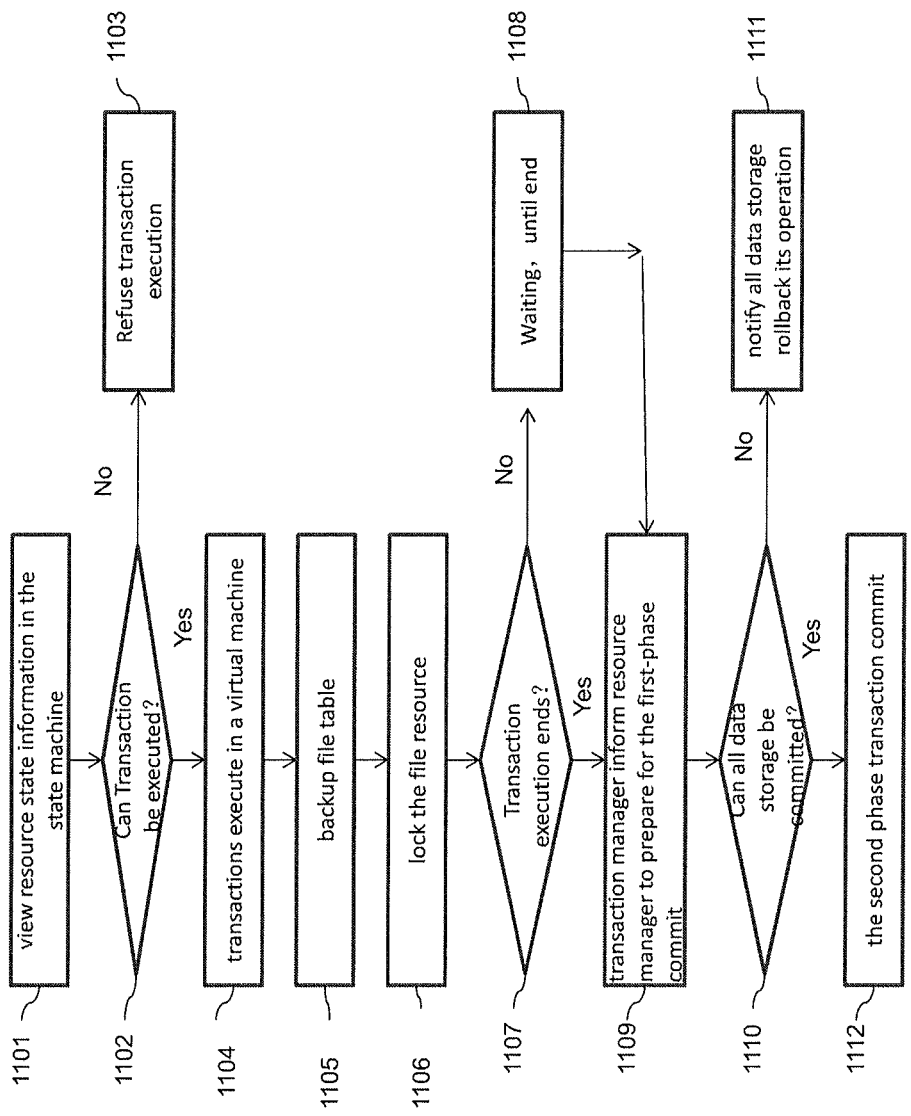
FIG. 11 shows a distributed transaction commit policy of the disclosed invention.

FIG. 11 shows a distributed transaction commit policy of the disclosed invention.

The disclosed invention uses a virtual machine state machine to simplify the standard DTP: when the transaction request arrives, first determine whether the transaction can be executed by the state machine. If the transaction can not be executed, the transaction is rejected, so as to ensure the probability of rollback is almost 0 after transaction execution. However, inevitably the exception will occur during the transaction execution, resulting in part of transaction branches failing. Here again, a simulation approach to file system is used to support two-phase transaction commit. The traditional transaction processing technology is mainly used in database system. The file system does not support transaction processing, which makes the multiple data storage transaction processing extremely complicated. Therefore, a simulation approach of file system is used to support two-phase transaction commit.

Specific process is as follows:

Step 1101, view resource state information in the state machine;

Step 1102, determine whether transaction can perform based on the resource state of the state machine. If so, the operation proceeds to step 1104; otherwise the process proceeds to step 1103;

Step 1103, refuse to execute the transaction, thus transaction will not proceed to the commit stage. In this case, the transaction is rejected in advance;

Step 1104, transactions execute in a virtual machine. The execution process will consume host resources, network resources, and storage resources;

Step 1105, in order to prevent the occurrence of rollback, backup file table in advance;

Step 1106, lock the shared resource used by transaction execution;

Step 1107, the transaction manager determines whether the transaction execution end, and if so, proceeds to step 1109; otherwise proceeds to step 1108;

Step 1108, wait until the transaction execution completes;

Step 1109, the transaction manager informs resource manager to prepare for the first-phase commit;

Step 1110, determine whether all the data storage can be submitted. If so, proceeds to step 1112; otherwise the process proceeds to step 1111;

Step 1111, notify all data storage to rollback its operation. Roll back the transaction;

Step 1112, the second phase transaction commit.

Figure 12:
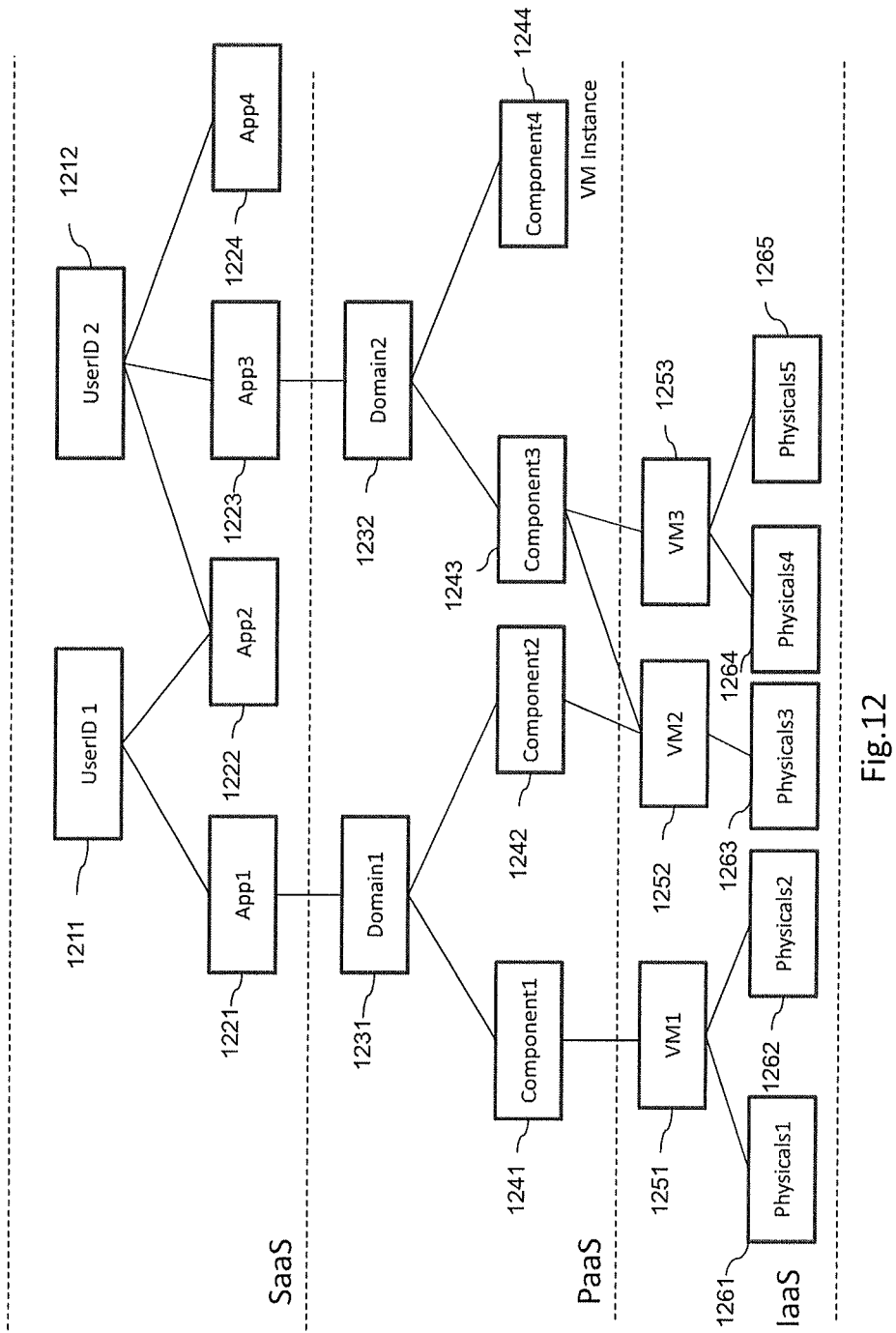
FIG. 12 shows the logic relationship and level of executing user's request.

FIG. 12 shows the logic relationship and level of executing user's request.

The figure describes the logic relationship and level of executing user's request, wherein resources are involved, from the user, application, transaction, domain, the virtual machine instance, and physical infrastructure. Their positions can be uniformly defined. User ID 121 refers to the user number assigned to user after user log in. APP 122 refers to application the user request. Domain refers to a logical network, for example, in a company, different departments use different virtual network, namely domain. Component refers VM instance.

As can be seen from the figure, user defines the policies. An user can request multiple applications simultaneously: UserID 1 1211 sends requests to applications App1 1221 and App2 1222; multiple users can multiplex an app: UserID1 1211 and UserID2 1212 multiplex an application App2 1222; an app corresponds to a domain: App1 1221 corresponds to Domain 11231; Multiple components are under one domain: Component1 1241 and Component2 1242 are under Domain 1231; a virtual machine instance runs on a component; component refers to the VM beneath it. A component can refer to a VM, a VM can be referenced by multiple components: Component1 1241 refers to VM1 1251, and both component2 1242 and Component3 1243 refer to VM2 1252; thus a VM can be used simultaneously by multiple domain. From the user's perspective, a VM can only be used in a Domain, VM don't cross domain, to ensure logical isolation among domains. VM runs on physical resource, and Monitor is used to monitor the state of the physical resource. Users can reference the physical resources beneath them through ID system.

Meanwhile, the bottom-up reference can be achieved: If an error occurs to certain physical resource, the error need be reported to the user, which can be achieved by layered resource strategy.

As shown, the architecture is divided into IaaS, PaaS, and SaaS layer. IaaS layer is infrastructure resource layer, PaaS is the platform layer, and SaaS is the application service layer. Virtual machines 125 and physical resources 126 resides at the bottom layer, namely IaaS, as they are media on which user application can run. This is achieved by creating logic hierarchical relationship between virtual machines and their physical resources to run on. The Domain 123 and Component 124 in the middle of the architecture reside at PaaS layer. Domain 123 refers to a virtual network, such as the financing department and marketing department of a company using different virtual networks. Component 124 refers to the VM instance, where multiple virtual machines can run in Domain 123, so that logical correspondence between virtual machine instance and Domain 123 can be built. The medium of virtual machine instance is virtual machine, hence logic relationship between VM 125 and domain 123 can be built. A VM 125 can be used by multiple components 124, so that component 124 can belong to a single domain 123, or to multiple different domains 123. Therefore, a virtual machine 125 can be used by multiple domains 123, but from the user's viewpoint, a domain is separated from each other, without any connection. SaaS is positioned as the top layer, including the user ID and the application. A user is an initiator of the application, who defines a variety of strategies of usage. A user can use multiple applications, and an application can be used by multiple users. This is the multiplexing of application, also known as multi-tenant.

In summary, the present invention discloses a method for managing virtual machines, virtual networks, and virtual storage resources centrally to respond to large-scale concurrent transaction requests, and to provide virtual infrastructure resource service on demand for user.

Specifically, the user sends the application request on a web browser. The request reaches the core management module. The management core module analyzes the user's request, calculates resources required for executing the request, and submits the request to the virtual resources beneath it to be executed, and returns the result to the client after the execution complete.

Large-scale application requests can be executed concurrently. Distributed transaction processing system is used to avoid the resource use conflicts. The virtual machine state machine can be used to execute concurrent transactions. A resource location system is required to locate logically the virtual machine and the storage unit, and for further security purposes.

The above embodiments are provided to those familiar with the art to implement or use the invention/utility model. The person skilled in the art may make various modifications or changes based on the above-described embodiment, in the case of not departing from the idea of the invention/utility model, and thus protection for the present invention/utility are not to be limited to the above embodiments, but should be extended to maximum range of innovative features consistent with the claims mentioned.

What is claimed is:

1. A system for managing resources in a virtualized environment, comprising:
   an operating support system (OSS) and its associated network management system (NMS) and element management system (EMS), service delivery platform, master node, slave node, network switch and shared storage devices, and at least one virtual machine runs on said slave node, wherein:
   said service delivery platform is connected with said OSS, and forwards a resource request from the user to the master node;
   said master node is connected with said slave node and receives resource requests from the service delivery platform, said master node controls the slave node and said master node controls said virtual machine running on the slave node, and said master node includes a job submission description language (JSDL) agent module, Application Program, resource manager and transaction manager, wherein:
   said JSDL agent module parses resource requests and policy defined by user in JSDL file into transactions, calculates the resources required for each transaction execution, and sends transaction requests to said Application Program, wherein said JSDL file is transmitted to said JSDL agent module from the service delivery platform using JSDL protocol;
   said Application Program receives request from said JSDL agent module, defines transactions within transaction boundaries and accessible resources, and specifies a series of resource operations;
   said resource manager manages computer resources centrally, including physical device resources and virtual device resources, and is responsible for state control and unified resource location;
   said transaction manager controls the life cycle of transaction, including transaction begin and transaction end, and determines transaction scheduling and transaction routing based on transaction scheduling and routing information;
   there is at least one said slave node, which is connected to said network switch and shared storage device and said EMS, and interacts with said master node, said slave node further comprises:
- a resource manager agent module connected with said resource manager, and reports resource state information to master node using TCP protocol;
- a transaction implementation module connected with said transaction manager, is responsible for transaction commit;
- a Libvirt module connected with said transaction implementation module, provides a common API for common functions implemented by virtual machine monitor (VMM);
- said shared storage device is connected to network switch, slave node, and master node, respectively.

2. The system of claim 1, wherein devices managed by said EMS include physical devices and virtual devices.

3. The system of claim 1, wherein each said slave node includes several virtual machines, a VMM managing a number of virtual machines, and hardware device connected to said VMM, wherein said VMM is connected to virtual machines in said slave node, and is also connected to virtual machines in other slave nodes.

4. The system of claim 1, wherein said VMM contains a virtual switch (vSwitch), and a hardware device which includes a network interface card (Nic), said Nic is connected to vSwitch and network switches respectively, and virtual machine image and user file information are stored in said shared storage device.

5. The system of claim 1, wherein said transaction manager includes a transaction monitor, wherein said transaction monitor monitors the transaction and puts the transaction into a waiting queue.

6. The system of claim 1, wherein said transaction manager further comprises a transaction scheduler, wherein said transaction scheduler determines the priority of transaction and marks the transaction with higher priority, determines transactions that may operate concurrently and marks them, plans the sequence of operations, and determines whether the transaction can be executed and which slave node the transaction can be executed on.

7. The system of claim 6, wherein said resource manager comprises a resource state machine which stores resource state information required by transaction processing.

8. The system of claim 7, wherein the resource state information stored in said state machine includes a virtual machine state, a host state, a storage state, and a network state.

9. The system of claim 7, wherein said resource state machine comprises a state machine controller, detector controller, comparators, clock, registrar, and virtual machines state machine table, wherein said detector controller and comparators check and compare states and its transition, and wherein said state machine controller obtains required functions by configuring the registrar.

10. The system of claim 9, wherein a lifecycle of a virtual machine includes four main states: Running, Off, Paused, and Sleeping, which are stored in said virtual machine state machine table, wherein running state further includes user-defined programmable states.

11. The system of claim 1, wherein said transaction manager further comprises a transaction router, which determines the transaction route;
when a slave node is not available, the transaction is routed to another available slave node.

12. The system of claim 1, wherein said resource manager comprises a resource reference model, which represents mapping relationship between resource unified identifier and real resource address using a metadata of tree structure to build resource reference relationship.

13. The system of claim 12, wherein said resource reference model comprises resource reference table and resource information table, wherein:
said resource reference table includes the resource identity, resource description and resource metadata, each resource is assigned a unique identifier, and the resource can be located by resource name, wherein global resources can be integrated into a logical entity, and said metadata information includes logical address information of resource, said resource is referred layer by layer through a distributed hash table, until the real location of the resource is found;
said resource information table stores various resources description information, including network resources, storage resources, and server resources.

14. The system of claim 1, wherein said resource manager further comprises a resource management module which is used to manage resource access and configuration.

15. The system of claim 14, wherein said resource management module includes resource access authentication, access control and resource configuration information.

16. The system of claim 1, further comprising a host agent, distributed file system (DFS) application programming interface (API) and network API connected to master node, wherein:
Host agent reports virtual state information of slave node to master node, and updates master node as resource state changes;
DFS API provides storage resource interface to master node; and
Network API provides network resource interface to master node.

17. The system of claim 1, wherein said master node and several slave nodes are in a group, and several groups are in a data center, wherein a hierarchical relationship among reference resources is: from the data center to a group, from a group to the slave node, then to the virtual machine, and finally to the virtual machine hardware; or from the data center to a group, from a group to a slave node, and finally to the physical hardware on slave node; and
each resource has a unique identifier.

18. A method for managing resources in a virtualized environment based on distributed transaction processing, the method comprising:
forwarding, by a service delivery platform, a resource request from the user to the master node, wherein the service delivery platform manages objects based on virtual machines and sends interaction requests to an element management system (EMS) for querying master node information;
parsing, by job submission description language (JSDL) agent module, resource request and policy defined by users in job submission description language (JSDL) file into transactions, calculating the resources required for each transaction execution, and sending transaction requests to said application program, wherein said job submission description language (JSDL) file is transmitted to job submission description language (JSDL) agent module from the service delivery platform using job submission description language (JSDL) protocol;
defining, by application program, transactions and accessible resources within transaction boundaries, and specifying a series of operations for resources after receiving the transaction requests from the job submission description language (JSDL) agent module, wherein the application program is concerned with only service logic, not the specific resources in the physical layer;

monitoring, by transaction monitor, the transaction request, putting transaction into a waiting queue, and controlling lifecycle and two-phase commit of transaction;

determining, by transaction scheduler, whether the transaction can be executed and which slave nodes the transaction should be executed based on resource state information and policy in a resource state machine;

determining, by transaction router, transaction routing based on resource routing information in resource reference model, and transmitting the transaction to running slave nodes using routing protocol;

implementing transaction in slave nodes, wherein the execution of the transaction needs virtual machine resources, as well as server resources, network resources and storage resources;

updating the information in master nodes as resource state changes, wherein the execution of the transaction changes the state of various said resources; and returning the execution result for resource request to the user.

19. The method of claim 18, wherein said determination of whether a transaction can be executed by resource state and strategy further comprises:
if resources are unavailable, the transaction is refused to execute;
if resources are available, the transaction proceed to execute;
if it is a write transaction, lock related resource.

20. The method according to claim 19, further comprising:
if the transaction is rejected, putting the transaction to a wait queue, and waiting for the next execution; and
querying said resource state machine again to see if there are available resources.

21. The method of claim 18, further comprising:
backing up files to ensure atomicity of transaction, and
locking files to support transaction isolation, thus ensuring two-phase commit in file environments.

22. The method of claim 18, further comprising:
after a transaction is committed, the resource state information, the resource routing information and. resource allocation information are changed, and
resource manager agent module reports updated information to the master node.

23. The method of claim 18, further comprising:
defining policies by users, wherein said policies contain multiple users multiplex the same app, said app corresponds to a domain, several components are under a single domain, multiple components multiplex a virtual machine, a virtual machine uses multiple physical resources through the external monitor to monitor the physical state of the resource, and wherein the component is a virtual machine instance.

24. The method of claim 18, wherein said transaction request is a write transaction request or a read transaction request; if the transaction request is a write transaction request, putting the transaction in a transmit queue, sending the transaction to Libvirt in the slave node, calling VMM (virtual machine monitor) to execute transaction by Libvirt, and returning the result to a result queue and to cache the result, wherein the transaction comprises a series of write operations for the virtual machine;
if the transaction request is a read transaction request, putting the transaction in a read queue, sending the transaction to be executed to Transaction Read Handler, determining whether what is needed to read is cached virtual machine state information, and returning results to the result queue.

25. The method of claim 24, wherein said determining whether what is needed to read is cached virtual machine state information further comprises:
if what is needed to read is cached virtual machine state information, viewing information in the result queue;
if what is needed to read is not cached virtual machine state information, determining whether the virtual machine is idle.

26. The method of claim 25, wherein said determining whether the virtual machine is idle further comprises:
if the virtual machine is idle, calling the VMM to process the transaction by Libvirt, returning result to the result queue, and viewing information in the result queue,
if the virtual machine is not idle, waiting for the virtual machine to be idle.

27. The method of claim 18, further comprising:
assigning a unique identifier to the transaction;
measuring transaction performance in accordance with statistics of transaction arrivals, successes, and failures.

28. The method of claim 18, wherein said resource state information in said resource state machine further comprises virtual machine state information, host state information, storage state information, and network state information.

29. The method of claim 18, wherein said resource reference model comprises metadata information, identity information, resource description information, and resource information.

* * * * *